US007575325B2

(12) United States Patent
Suzuki et al.

(10) Patent No.: US 7,575,325 B2
(45) Date of Patent: Aug. 18, 2009

(54) IMAGE DISPLAYING APPARATUS AND COLOR SEPARATING-COMBINING OPTICAL SYSTEM

(75) Inventors: Tetsuji Suzuki, Yokosuka (JP); Satoru Moriya, Noda (JP)

(73) Assignee: Victor Company of Japan, Limited, Yokohama (JP)

( * ) Notice: Subject to any disclaimer, the term of this patent is extended or adjusted under 35 U.S.C. 154(b) by 187 days.

(21) Appl. No.: 11/700,858

(22) Filed: Feb. 1, 2007

(65) Prior Publication Data

US 2007/0132955 A1    Jun. 14, 2007

Related U.S. Application Data

(62) Division of application No. 10/797,483, filed on Mar. 11, 2004, now Pat. No. 7,188,954.

(30) Foreign Application Priority Data

Mar. 14, 2003 (JP) .......................... P2003-070511
Mar. 14, 2003 (JP) .......................... P2003-070562
Apr. 7, 2003 (JP) .......................... P2003-102599

(51) Int. Cl.
*G03B 21/14* (2006.01)
*G03B 21/26* (2006.01)
*G03B 21/28* (2006.01)
*G02F 1/135* (2006.01)
*G02B 5/30* (2006.01)
*G02B 27/28* (2006.01)
*G02B 27/14* (2006.01)
*H04N 9/07* (2006.01)

(52) U.S. Cl. ............................. 353/20; 353/37; 353/81; 353/99; 349/30; 359/490; 359/634; 348/338; 348/339

(58) Field of Classification Search ................. 353/20, 353/37, 81, 99; 349/30; 359/490, 634; 348/338, 348/339
See application file for complete search history.

(56) References Cited

U.S. PATENT DOCUMENTS 6,174,060 B1 *  1/2001  Imaoka et al. ................ 353/31
6,227,670 B1 *  5/2001  Numazaki et al. ............ 353/31

(Continued)

FOREIGN PATENT DOCUMENTS

JP          02-162988         6/1990

(Continued)

*Primary Examiner*—Diane I Lee
*Assistant Examiner*—Magda Cruz
(74) *Attorney, Agent, or Firm*—The Nath Law Group; Jerald L. Meyer; Derek Richmond

(57) ABSTRACT

An image displaying apparatus is capable of maintaining the contrast ratios of displayed images even if the f-value of an optical system of the apparatus is lowered to provide bright images, efficiently utilizing a beam from a light source, minimizing the size and weight of the optical system, and being easy to manufacture. The image displaying apparatus includes first to third reflective polarizing plates (120, 121, 122) provided for first to third reflective spatial light modulators (130, 131, 132), respectively. The reflective polarizing plates polarize and separate beams to be injected into the reflective spatial light modulators. In the image displaying apparatus, a color separating optical system has a larger effective diameter than a color composition prism (140).

2 Claims, 19 Drawing Sheets

U.S. PATENT DOCUMENTS 6,549,248 B1 * 4/2003 Miyazawa et al. .............. 349/9
6,783,242 B1 * 8/2004 Hirata et al. ................... 353/20

FOREIGN PATENT DOCUMENTS

| JP | 05-244616   | 9/1993  |
| -- | ----------- | ------- |
| JP | 07-084125   | 3/1995  |
| JP | 10-142713   | 5/1998  |
| JP | 10-197839   | 7/1998  |
| JP | 11-015074   | 1/1999  |
| JP | 2000-267046 | 9/2000  |
| JP | 2001-154152 | 6/2001  |
| JP | 2001-215491 | 8/2001  |
| JP | 2002-090874 | 3/2002  |
| JP | 2002-365591 | 12/2002 |
| JP | 2002-372749 | 12/2002 |
| JP | 2003-021868 | 1/2003  |
| JP | 2003-066404 | 3/2003  |
| JP | 2003-075778 | 3/2003  |
| JP | 2003-131212 | 5/2003  |
| JP | 2004-184889 | 7/2004  |

* cited by examiner

IMAGE DISPLAYING APPARATUS AND COLOR SEPARATING-COMBINING OPTICAL SYSTEM This application is a divisional application of U.S. patent application Ser. No. 10/797,483 filed on Mar. 11, 2004, now U.S. Pat. No. 7,188,954, the contents of which are hereby incorporated by reference in their entirety.

FIELD OF THE INVENTION

The present invention relates to an image displaying apparatus and a color separating-combining optical system. In particular the present invention relates to a three-panel, projection-type image displaying apparatus employing reflective spatial light modulators and to a color separating-combining optical system used for such an image displaying apparatus.

BACKGROUND OF THE INVENTION

Conventionally, a three-panel, projection-type image displaying apparatus (color projector) employs a strong light source such as a metal halide lamp to emit white light. The white light is separated into red (R), green (G), and blue (B) primary color beams to irradiate reflective spatial light modulators, respectively. The modulators are driven by R, G, and B video signals to modulate the R, G, and B beams and reflect the modulated beams, which are combined and projected.

FIG. 1 is a perspective view showing a conventional image displaying apparatus. This is a three-panel, projection-type image displaying apparatus employing reflective spatial light modulators, disclosed in Japanese Patent Application Laid-Open Publication No. H10-197949. The image displaying apparatus has upper and lower optical systems arranged in upper and lower layers, respectively.

In the upper optical system, a light source 11 emits a beam of light, which is passed through a collimator lens 20 and first and second integrators 21a and 21b. The beam is reflected by a cold mirror 22 so that the beam is deflected by 90 degrees. The beam is passed through a third integrator 21c and an infrared cut filter 23 and is injected into a front face of a three-color-separating cross dichroic prism 24. The first to third integrators 21a, 21b, and 21c form an integrator 21. The prism 24 separates the incident beam into red (R), green (G), and blue (B) primary color beams, which emanate from the side and back faces of the prism 24, respectively, into three directions. The three primary-color beams are injected into upper polarizing beam splitter prisms 12r, 12g, and 12b, respectively. The polarizing reflective faces of the prisms 12r, 12g, and 12b reflect each an s-polarized component toward the lower optical system.

Output beams from the upper polarizing beam splitter prisms 12r, 12g, and 12b are passed through convex lenses 13r, 13g, and 13b and polarizers 14r, 14g, and 14b, respectively, and are injected into lower polarizing beam splitter prisms 15r, 15g, and 15b, respectively.

In the lower optical system, the beams injected into the lower polarizing beam splitter prisms 15r, 15g, and 15b are reflected by polarizing reflective faces thereof, are passed through wave plates 16r, 16g, and 16b, and are injected into reflective spatial light modulators 17r, 17g, and 17b, respectively. If skewed light components are injected into the polarizing reflective face of any one of the prisms 15r, 15g, and 15b, a beam transmitted through and emitted from the prism will have a polarized state that is not linear. Accordingly, the wave plates 16r, 16g, and 16b correct the phase characteristics of beams transmitted through the prisms 15r, 15g, and 15b and provide linearly polarized beams. At the same time, the wave plates 16r, 16g, and 16b correct pre-tilted states of liquid crystals in the modulators 17r, 17g, and 17b.

The reflective spatial light modulators 17r, 17g, and 17b modulate the incident beams in response to video signals and reflect the modulated beams, which return to the lower polarizing beam splitter prisms 15r, 15g, and 15b. Only the modulated components are transmitted through the polarizing reflective faces of the prisms 15r, 15g, and 15b.

The beams transmitted through the polarizing reflective faces of the lower polarizing beam splitter prisms 15r, 15g, and 15b enter the side and back faces of a three-color-combining cross dichroic prism 25, respectively. The color beams injected into the prism 25 are combined into one, which emanates from the front face of the prism 25 and enters a projection lens 18.

The beam injected into the projection lens 18 is projected therefrom onto a screen (not shown) to display an image.

The polarizing beam splitter prisms used in the image displaying apparatus according to the conventional art mentioned above are each an optical element having a polarizing reflective face that, ideally, reflects 100% of an s-polarized component and transmits 100% of a p-polarized component.

FIG. 2A is a graph showing the wavelength dependence of transmittance of a p-polarized component in a polarizing beam splitter prism, and FIG. 2B is a view showing an incident angle β between the optical axis L0 of a polarizing beam splitter prism 30 and an incident beam L1.

The polarizing beam splitter prism can realize various characteristics depending on a film structure formed on a polarizing reflective face. In practice, it is impossible to provide ideal characteristics. The prism realizes a relatively high extinction ratio for an s-polarized component but a low extinction ratio for an s-polarized component. More precisely, the polarizing reflective face reflects more than 99%, nearly 100% of a linear s-polarized incident beam, and therefore, transmits substantially no part of the s-polarized beam. On the other hand, for a p-polarized incident beam, the prism transmits about 90% of the beam at the maximum and about 20% thereof at some incident angles and wavelengths, as shown in FIG. 2A. The remaining ten to several tens of percents of the p-polarized beam is reflected as leakage in the same direction as a reflected s-polarized beam. This is a disadvantage of the conventional art.

To overcome the disadvantage, the image displaying apparatus according to the conventional art employs the upper polarizing beam splitter prism serving as a pre-polarizer in front of the lower polarizing beam splitter prism serving as a main polarizer. The pre-polarizer prevents an unnecessary polarized component from mixing with an incident beam to the reflective spatial light modulator and improves the purity of an s-polarized component. Namely, the pre-polarizer prevents a p-polarized component from mixing with an incident beam to the lower polarizing beam splitter prism, so that only an s-polarized component may be reflected by the polarizing reflective face of the lower polarizing beam splitter prism toward the reflective spatial light modulator. When the reflective spatial light modulator reflects a modulated beam toward the lower polarizing beam splitter prism, the polarizing reflective face of the prism reflects nearly 100% of an unnecessary s-polarized component and transmits only a p-polarized component, thereby improving a contrast ratio of an image to be displayed.

In this way, the image displaying apparatus according to the conventional art needs the polarizing beam splitter prism serving as a pre-polarizer, which increases the size of the optical system of the image displaying apparatus.

In recent years, there are demands for projection-type image displaying apparatuses capable of displaying bright images. To increase the brightness of a displayed image, the f-value of an optical system-of an image displaying apparatus must be decreased. Reducing the f-value of an optical system increases an angle between a beam and an optical axis, to increase skewed components in a beam injected into a polarizing beam splitter prism. The skewed components deteriorate the polarization and separation characteristics of the prism, thereby decreasing the contrast ratio of displayed images.

This problem is caused because the polarizing beam splitter prism has a disadvantage of fluctuating the polarization and separation characteristics thereof depending on beam's incident angles. The polarizing beam splitter prism is a rectangular prism having an oblique face coated with several tens of layers of dielectric films made by vapor deposition. Two or more kinds of dielectric materials having different refractive indexes are alternately laid one upon another on the oblique face. At each interface between the layers, refracted light and reflected light cause a phase interference to provide functions of reflecting an s-polarized component and transmitting a p-polarized component. A phase interference relationship between the refracted light and the reflected light at each interface differs depending on an incident angle of light. Namely, the polarizing and separating characteristics of a polarizing beam splitter prism change according to an incident angle of light.

FIG. 2A is a graph showing the wavelength dependence of transmittance of a p-polarized component in a visible wavelength zone in a polarizing beam splitter prism with an incident angle $\beta$ between an incident beam and a transmission face (incident face) serving as a parameter.

In FIG. 2A, a curve "a" represents an incident angle $\beta$ of 0 degrees, "b" −6 degrees, "c" −15 degrees, "d" +6 degrees, and "e" +15 degrees. The transmission face of the polarizing beam splitter prism is orthogonal to an optical axis, and the incident angle $\beta$ is equal to an angle between an incident beam to the prism and the optical axis. As shown in FIG. 2A, the wavelength dependence of transmittance of a p-polarized component is relatively constant when the incident angle $\beta$ is within ±6 degrees. When the incident angle $\beta$ exceeds the range of ±6 degrees, the transmittance of a p-polarized component becomes greatly dependent on wavelengths and the transmittance itself decreases.

A deterioration in the polarizing and separating characteristics of the polarizing beam splitter prism leads to a decrease in the contrast ratio of an image displayed.

The image displaying apparatus employing the polarizing beam splitter prism sometimes causes shading (unevenness) on a projection screen. This is caused when the polarizing face of the prism partially rotates within the prism. To prevent this, double refraction (distortion) in the glass material of the prism must be minimized. Namely, the prism must be made of a material having a small photoelastic constant.

Employing such material makes the manufacturing of the polarizing beam splitter prism more difficult and increases the cost thereof. In addition, such material involves a large specific weight to increase the total weight of the optical system of the image displaying apparatus. If a large reflective spatial light modulator is employed, the polarizing beam splitter prism must be enlarged accordingly, to greatly increase the total weight of the optical system.

The image displaying apparatus according to the conventional art employs the dichroic prism in the upper optical system that carries out color separation. Namely, the upper optical system for color separation has substantially the same size as the lower optical system for color composition. In this arrangement, a beam from the light source gradually converges toward the reflective spatial light modulators, to cause an eclipse particularly in the upper optical system for color separation. The eclipse deteriorates beams qualitatively and quantitatively. The image displaying apparatus according to the conventional art, therefore, demonstrates a poor light usage ratio and is unable to display sufficiently bright images.

SUMMARY OF THE INVENTION

A first aspect of the present invention provides an image displaying apparatus including a light source configured to emit a beam containing at least three primary colors, first to third reflective spatial light modulators corresponding to the three primary colors, respectively, a color separating optical system configured to separate the beam emitted from the light source into three primary color beams and guide the three primary color beams toward the first to third reflective spatial light modulators, first to third reflective polarizing plates provided for the first to third reflective spatial light modulators, respectively, each of the reflective polarizing plates being configured to polarize and separate the corresponding primary color beam guided by the color separating optical system into a linearly polarized beam of a first polarized state, transmit and inject the linearly polarized beam of the first polarized state into the corresponding reflective spatial light modulator, polarize and separate a modulated-and-reflected beam from the corresponding reflective spatial light modulator into a linearly polarized beam of a second polarized state, and reflect the linearly polarized beam of the second polarized state, a color combining optical system configured to combine the three primary color beams modulated by the reflective spatial light modulators and reflected by the reflective polarizing plates into a composite beam, and an image forming unit configured to receive the composite beam and form an image according to the received composite beam. The color separating optical system has a larger effective diameter than the color combining optical system.

The image displaying apparatus according to the first aspect employs the reflective polarizing plates to polarize and separate beams that are injected into the reflective spatial light modulators. Even if the f-value of the color separating optical system is lowered to display bright images, the contrast ratios of displayed images will never decrease. The reflective polarizing plates enable an optical system to be compact, lightweight, and easy to manufacture.

In the image displaying apparatus of the first aspect, the effective diameter of the color separating optical system is greater than that of the color combining optical system. Even if a beam emitted from the light source converges toward the reflective spatial light modulators, the beam can efficiently be used.

In the image displaying apparatus of the first aspect, it is preferable that the color separating optical system includes a first dichroic mirror configured to separate the beam from the light source into a first-second primary color beam and a third primary color beam, a second dichroic mirror configured to separate the first-second primary color beam into a first primary color beam and a second primary color beam, and first to third steering mirrors configured to substantially vertically deflect the first to third primary color beams, respectively, toward the first to third reflective polarizing plates and first to third reflective spatial light modulators.

Forming the color separating optical system of the image displaying apparatus with the dichroic mirrors optimizes optical paths in the color separating optical system.

In the image displaying apparatus of the first aspect, it is preferable that the optical axes of the beams traveling from the first to third steering mirrors to the first to third reflective spatial light modulators are parallel to one another.

Arranging the color separating optical system and the color combining optical system in upper and lower layers, respectively, according to the first aspect improves space efficiency in the image displaying apparatus.

In the image displaying apparatus of the first aspect, it is preferable that the color combining optical system is a cross dichroic prism.

Forming the color combining optical system with a cross dichroic prism minimizes the optical system.

In the image displaying apparatus of the first aspect, it is preferable that the first to third reflective spatial light modulators are attached to a planar substrate at three locations around the cross dichroic prism that is also attached to the planar substrate and that beam incident faces of the reflective spatial light modulators are substantially on the same plane.

Arranging the beam incident faces of the reflective spatial light modulators substantially on the same plane makes it easy to cool the reflective spatial light modulators and prevent foreign matter from attaching to the reflective spatial light modulators.

A second aspect of the present invention provides an image displaying apparatus including a light source configured to emit a beam containing at least three primary colors, first to third reflective spatial light modulators corresponding to the three primary colors, respectively, a color separating optical system configured to separate the beam emitted from the light source into three primary color beams and guide the three primary color beams toward the first to third reflective spatial light modulators through first to third steering mirrors, respectively, first to third reflective polarizing plates provided for the first to third reflective spatial light modulators, respectively, each of the reflective polarizing plates being configured to polarize and separate the corresponding primary color beam guided by the color separating optical system into a linearly polarized beam of a first polarized state, transmit and inject the linearly polarized beam of the first polarized state into the corresponding reflective spatial light modulator, polarize and separate a modulated-and-reflected beam from the corresponding reflective spatial light modulator into a linearly polarized beam of a second polarized state, and reflect the linearly polarized beam of the second polarized state, a color combining optical system configured to combine the three primary color beams modulated by the reflective spatial light modulators and reflected by the reflective polarizing plates into a composite beam, and an image forming unit configured to receive the composite beam and form an image according to the received composite beam.

A third aspect of the present invention provides an image displaying apparatus including a light source configured to emit a beam containing at least three primary colors, first to third reflective spatial light modulators corresponding to the three primary colors, respectively, a color separating optical system configured to separate the beam emitted from the light source into three primary color beams and guide the three primary color beams toward the first to third reflective spatial light modulators through first to third steering mirrors, respectively, first to third reflective polarizing plates provided for the first to third reflective spatial light modulators, respectively, each of the reflective polarizing plates being configured to polarize and separate the corresponding primary color beam guided by the color separating optical system into a linearly polarized beam of a first polarized state, transmit and inject the linearly polarized beam of the first polarized state into the corresponding reflective spatial light modulator, polarize and separate a modulated-and-reflected beam from the corresponding reflective spatial light modulator into a linearly polarized beam of a second polarized state, and reflect the linearly polarized beam of the second polarized state, a color combining optical system configured to combine the three primary color beams modulated by the reflective spatial light modulators and reflected by the reflective polarizing plates into a composite beam, and an image forming unit configured to receive the composite beam and form an image according to the received composite beam. The optical axes of the beams traveling from the first to third steering mirrors to the first to third reflective spatial light modulators are parallel to one another, and the planes of polarization of two of the beams are orthogonal or parallel to each other.

The image displaying apparatus according to any one of the second and third aspects employs the reflective polarizing plates to polarize and separate beams that are injected into the reflective spatial light modulators. Even if the f-value of the color separating optical system is lowered to display bright images, the contrast ratios of displayed images will never decrease. The reflective polarizing plates enable an optical system to be compact, lightweight, and easy to manufacture.

The image displaying apparatus according to any one of the second and third aspects arranges the color separating optical system and the color combining optical system in upper and lower layers, respectively, to improve space efficiency in the image displaying apparatus. Any one of the second and third aspects optimizes optical paths of the beams injected into the steering mirrors, to minimize the size of the optical system.

In the image displaying apparatus of any one of the second and third aspects, it is preferable that the color separating optical system includes a first dichroic mirror configured to separate the beam from the light source into a first-second primary color beam and a third primary color beam and a second dichroic mirror configured to separate the first-second primary color beam into a first primary color beam and a second primary color beam.

Forming the color separating optical system with the dichroic mirrors optimizes optical paths in the color separating optical system.

In the image displaying apparatus of any one of the second and third aspects, it is preferable that the color combining optical system is a cross dichroic prism.

The color combining optical system consisting of a cross dichroic prism is compact.

In the image displaying apparatus of any one of the second and third aspects, it is preferable that the first to third reflective spatial light modulators are attached to a planar substrate at three locations around the cross dichroic prism that is also attached to the planar substrate and that beam incident faces of the reflective spatial light modulators are substantially on the same plane.

Arranging the beam incident faces of the reflective spatial light modulators substantially on the same plane makes it easy to cool the reflective spatial light modulators and prevent foreign matter from attaching to the reflective spatial light modulators.

A fourth aspect of the present invention provides a color separating-combining optical system including first to third reflective spatial light modulators corresponding to first to third primary colors, respectively, the primary colors being contained in a beam emitted from a light source, a color separating optical system configured to separate the beam emitted from the light source into three primary color beams and guide the three primary color beams toward the first to third reflective spatial light modulators, first to third reflective polarizing plates provided for the first to third reflective spatial light modulators, respectively, each of the reflective polarizing plates being configured to polarize and separate the corresponding primary color beam guided by the color separating optical system into a linearly polarized beam of a first polarized state, transmit and inject the linearly polarized beam of the first polarized state into the corresponding reflective spatial light modulator, polarize and separate a modulated-and-reflected beam from the corresponding reflective spatial light modulator into a linearly polarized beam of a second polarized state, and reflect the linearly polarized beam of the second polarized state, and a color combining optical system configured to combine the three primary color beams modulated by the reflective spatial light modulators and reflected by the reflective polarizing plates into a composite beam.

According to the fourth aspect, the optical axes of the primary color beams passing through the color separating optical system, reflective polarizing plates, and color combining optical system are substantially on the same plane, and the lengths of optical paths for the primary color beams from the light source to the reflective spatial light modulators are substantially equal to one another.

According to the fourth aspect, the color combining optical system includes at least first to third prisms arranged to include at least first and second pairs of opposing faces, the first pair of opposing faces having a first reflective layer to transmit the first primary color beam and reflect the second primary color beam, the second pair of opposing faces having a second reflective layer to transmit the first and second primary color beams and reflect the third primary color beam.

According to the fourth aspect, the first primary color beam enters the first prism, passes through the first reflective layer, second prism, second reflective layer, and third prism, and emanates from the third prism. The second primary color beam enters the second prism, is reflected by the first reflective layer, passes through the second prism, second reflective layer, and third prism, is combined with the first primary color beam, and emanates from the third prism. The third primary color beam enters the third prism, is reflected by the second reflective layer, passes through the third prism, is combined with the second and third primary color beams, and emanates from the third prism.

The fourth aspect employs the reflective polarizing plates to polarize and separate beams that are injected into the reflective spatial light modulators. Even if the f-value of the color separating-combining optical system is lowered to display bright images with an image displaying apparatus that employs the optical system, the contrast ratios of displayed images will never decrease. The reflective polarizing plates enable an optical system to be compact, lightweight, and easy to manufacture.

According to the fourth aspect, the optical axes of the primary color beams passing through the color separating optical system, reflective polarizing plates, and color combining optical system are substantially on the same plane. This minimizes the optical system as a whole and improves space efficiency. According to the fourth aspect, the lengths of optical paths for the primary color beams from the light source to the reflective spatial light modulators are substantially equal to one another. Accordingly, the primary color beams cause no difference in illumination efficiency and incident angles to the reflective spatial light modulators. As a result, an image displaying apparatus employing the color separating-combining optical system of the fourth aspect can display images of good color balance.

The color separating-combining optical system of the fourth aspect can employ a Philips prism as the color combining optical system, to minimize the size of the color combining optical system. Unlike the cross dichroic prism, the Philips prism has no central joints that may badly affect displayed images.

A fifth aspect of the present invention provides an image displaying apparatus including the color separating-combining optical system of the fourth aspect, a light source configured to emit a beam containing at least three primary colors toward the color separating optical system of the color separating-combining optical system, and an image forming unit configured to receive the composite beam from the color combining optical system of the color separating-combining optical system and form an image according to the received composite beam.

The image displaying apparatus of the fifth aspect employs the reflective polarizing plates to polarize and separate beams that are injected into the reflective spatial light modulators. Even if the f-value of the color separating optical system is lowered to display bright images, the contrast ratios of displayed images will never decrease. The reflective polarizing plates enable an optical system to be compact, lightweight, and easy to manufacture.

According to the fifth aspect, the optical axes of the primary color beams passing through the color separating optical system, reflective polarizing plates, and color combining optical system are substantially on the same plane. This minimizes the optical system as a whole and improves space efficiency. According to the fifth aspect, the lengths of optical paths for the primary color beams from the light source to the reflective spatial light modulators are substantially equal to one another. Accordingly, the primary color beams cause no difference in illumination efficiency and incident angles to the reflective spatial light modulators. As a result, the image displaying apparatus can display images of good color balance.

The image displaying apparatus of the fifth aspect can employ a Philips prism as the color combining optical system, to minimize the size of the color combining optical system. Unlike the cross dichroic prism, the Philips prism has no central joints that may badly affect displayed images.

BRIEF DESCRIPTION OF THE DRAWINGS

Figure 1:
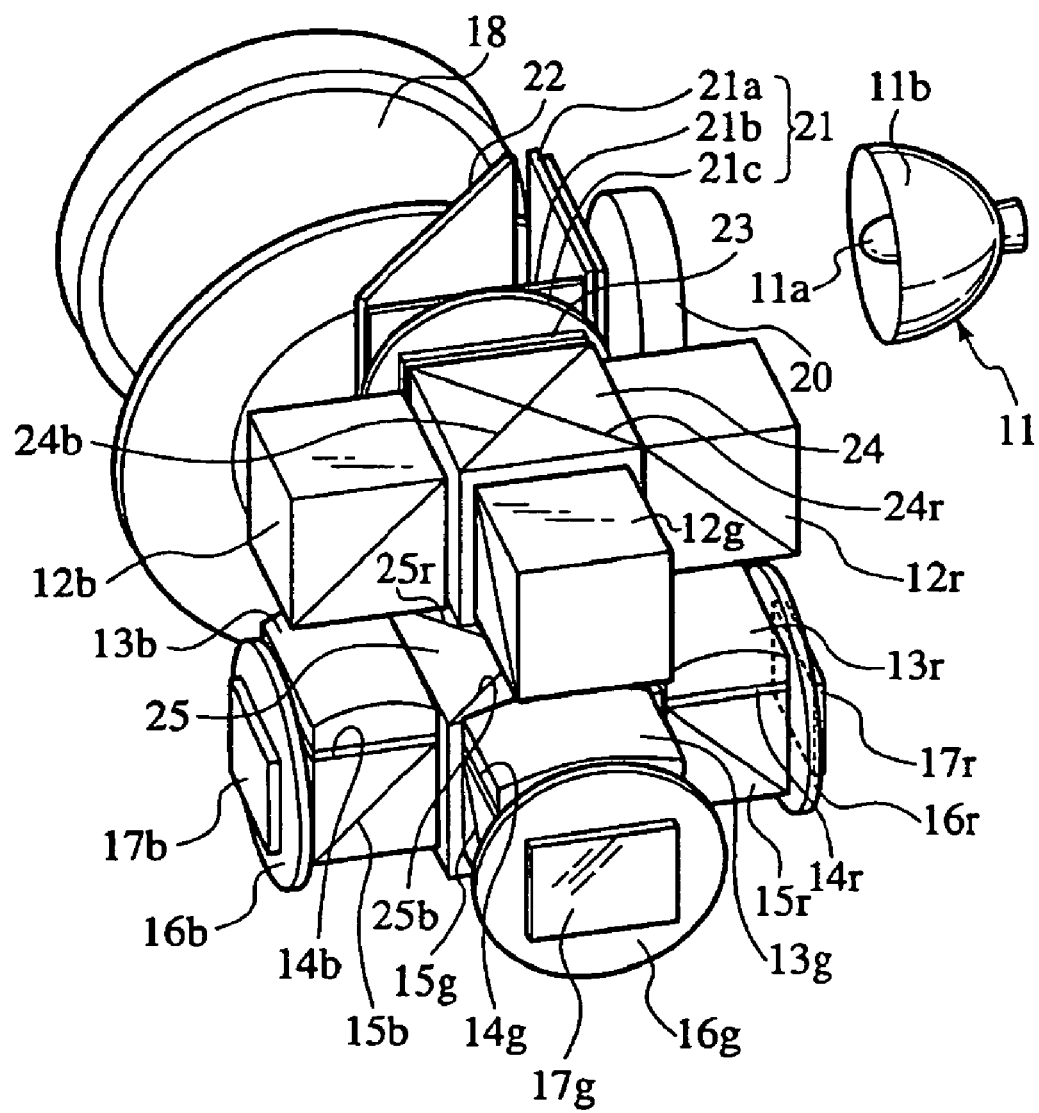

Having thus described the invention in general terms, reference will now be made to the accompanying drawings, which are not necessarily drawn to scale, and wherein:

FIG. 1 is a perspective view showing an image displaying apparatus according to a conventional art.

Figure 2A:
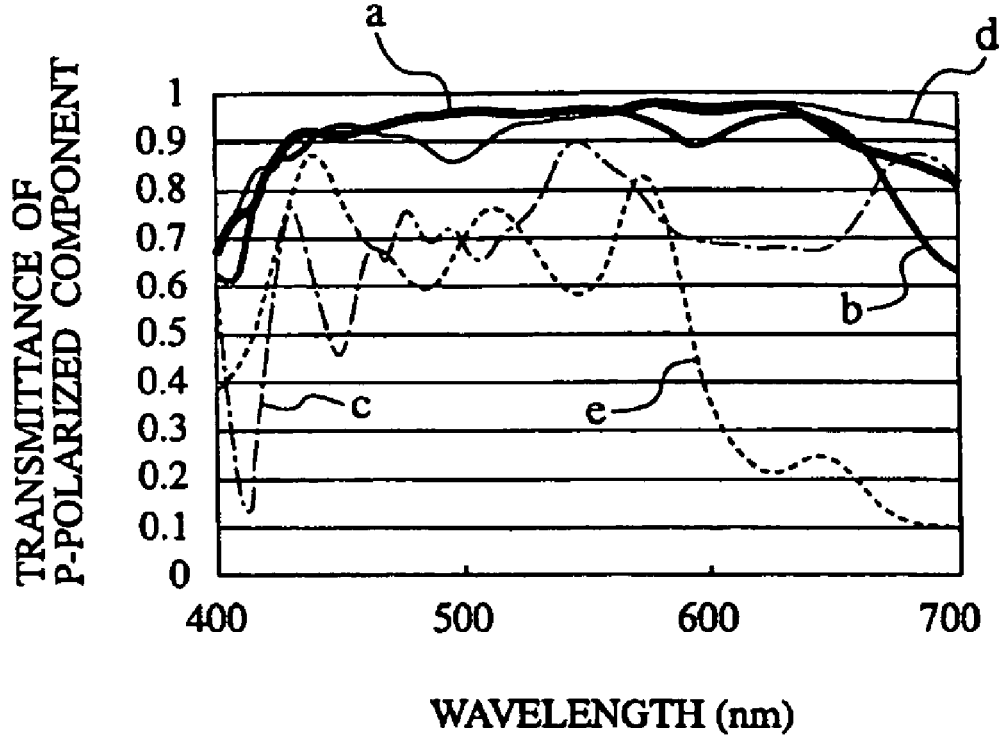

FIG. 2A is a graph showing the wavelength dependence of transmittance of a p-polarized component of a polarizing beam splitter prism employed by the conventional art.

Figure 2B:
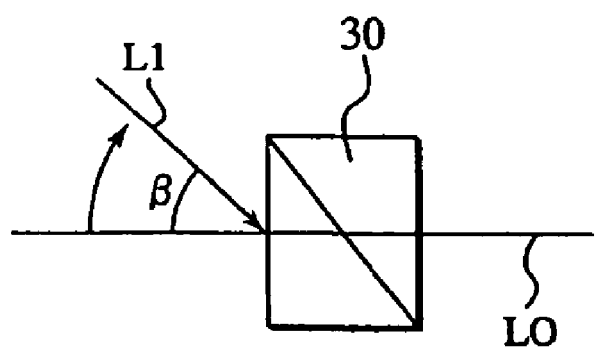

FIG. 2B is a view showing an incident angle β between a polarizing beam splitter prism and an incident beam.

Figure 3:
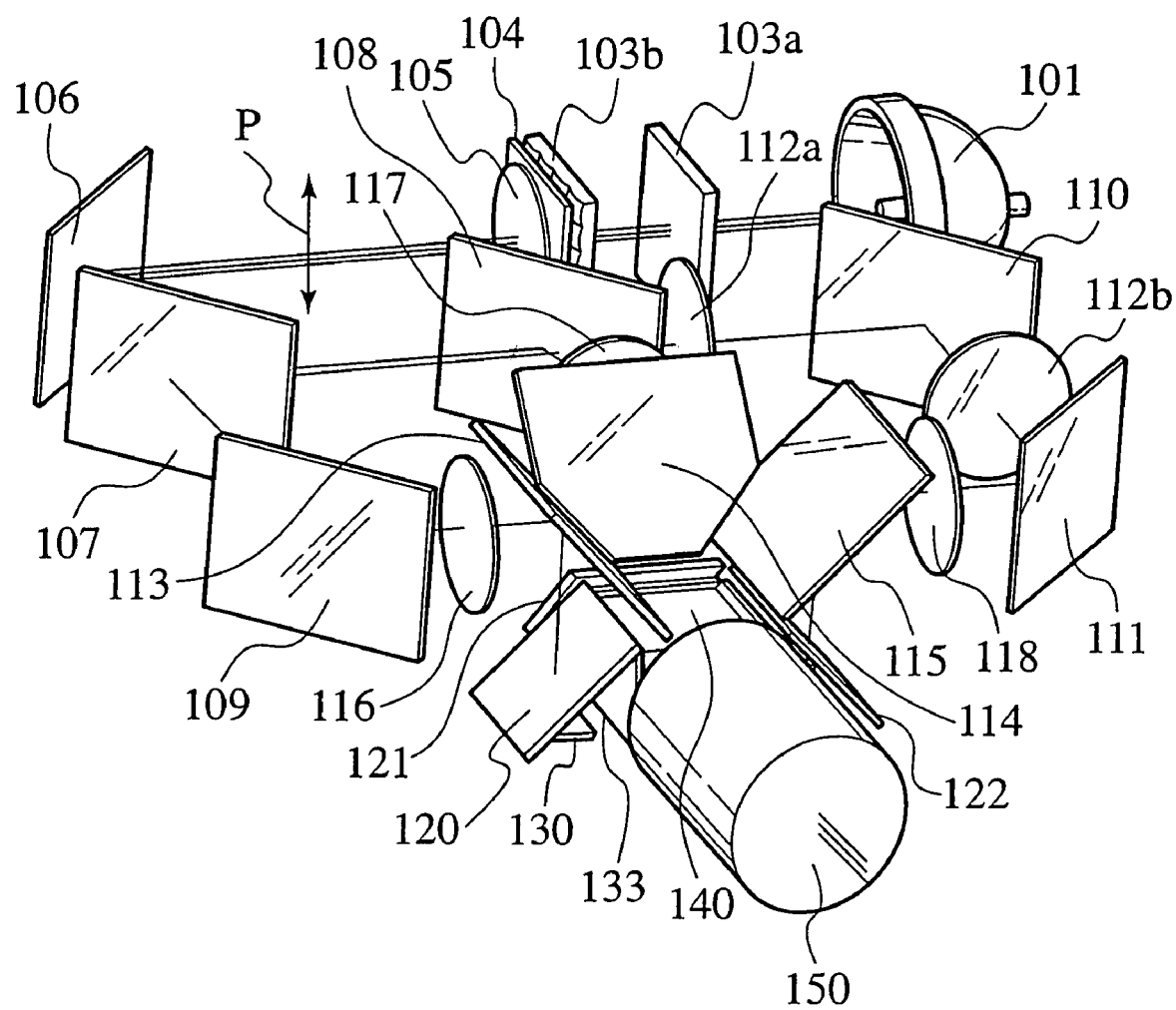

FIG. 3 is a perspective view showing an image displaying apparatus according to a first embodiment of the present invention.

Figure 4:
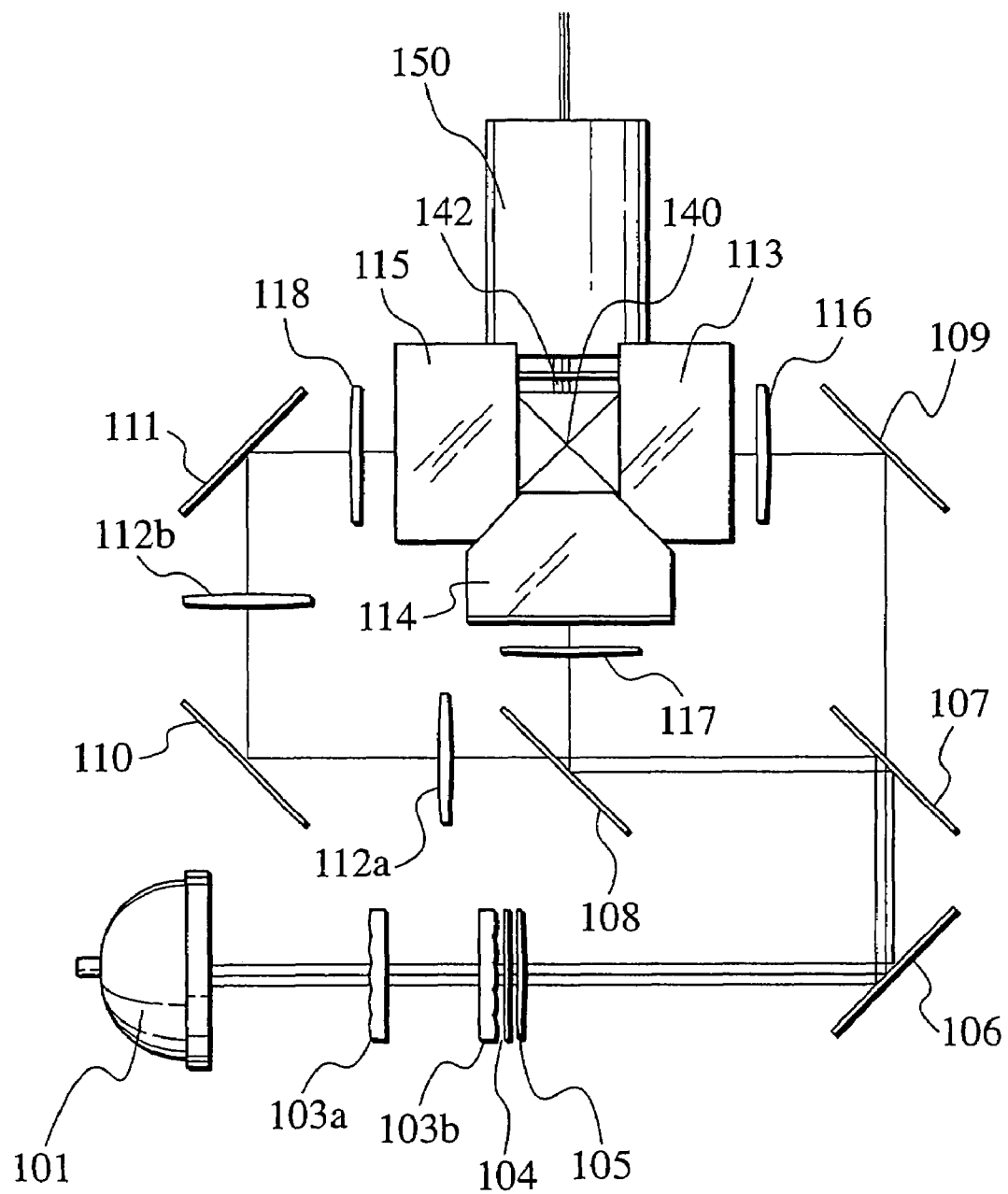

FIG. 4 is a plan view showing the image displaying apparatus of the first embodiment.

Figure 5A:
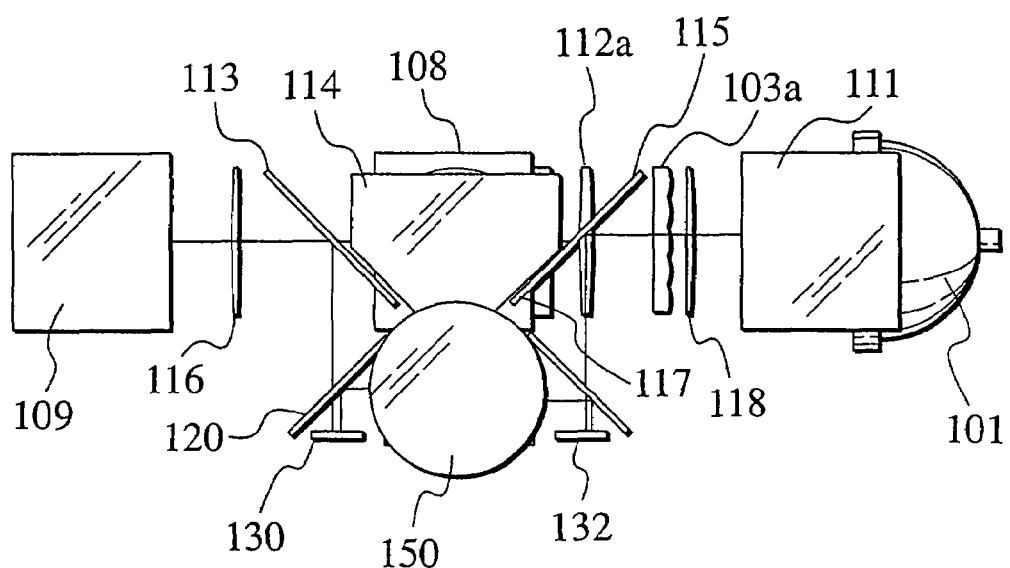

FIG. 5A is a front view showing the image displaying apparatus of the first embodiment.

Figure 5B:
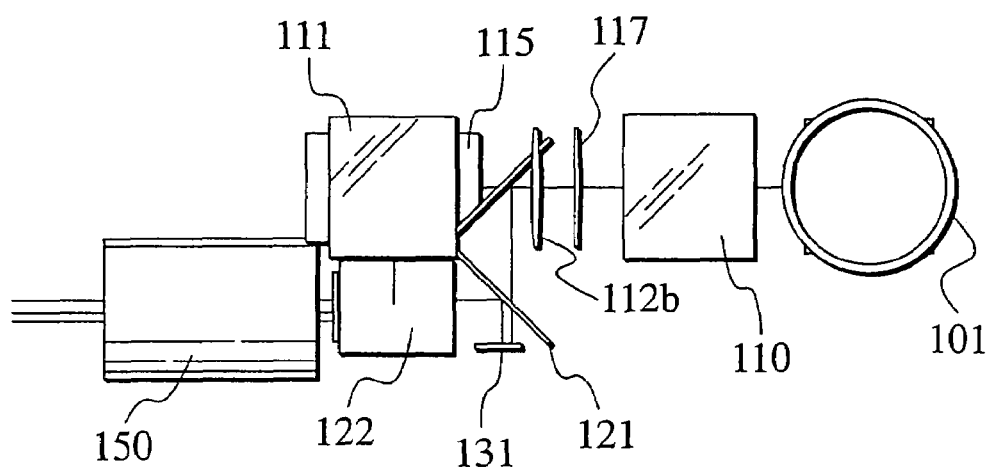

FIG. 5B is a side view showing the image displaying apparatus of the first embodiment.

Figure 6:
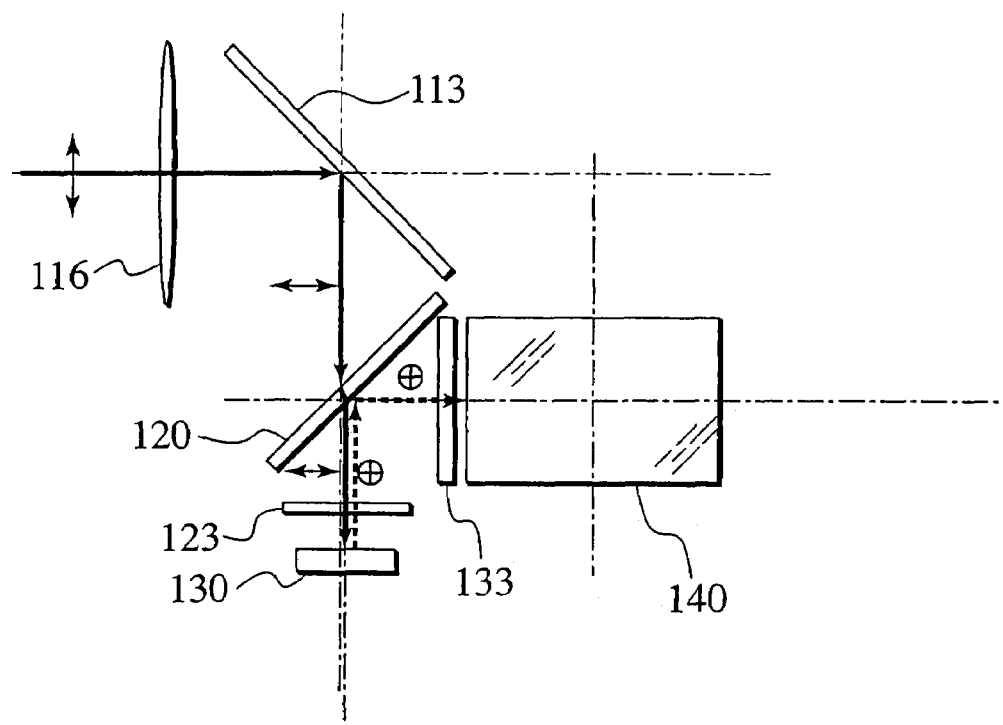

FIG. 6 is a side view showing a polarizing-separating section including a reflective polarizing plate in the image displaying apparatus of the first embodiment.

Figure 7:
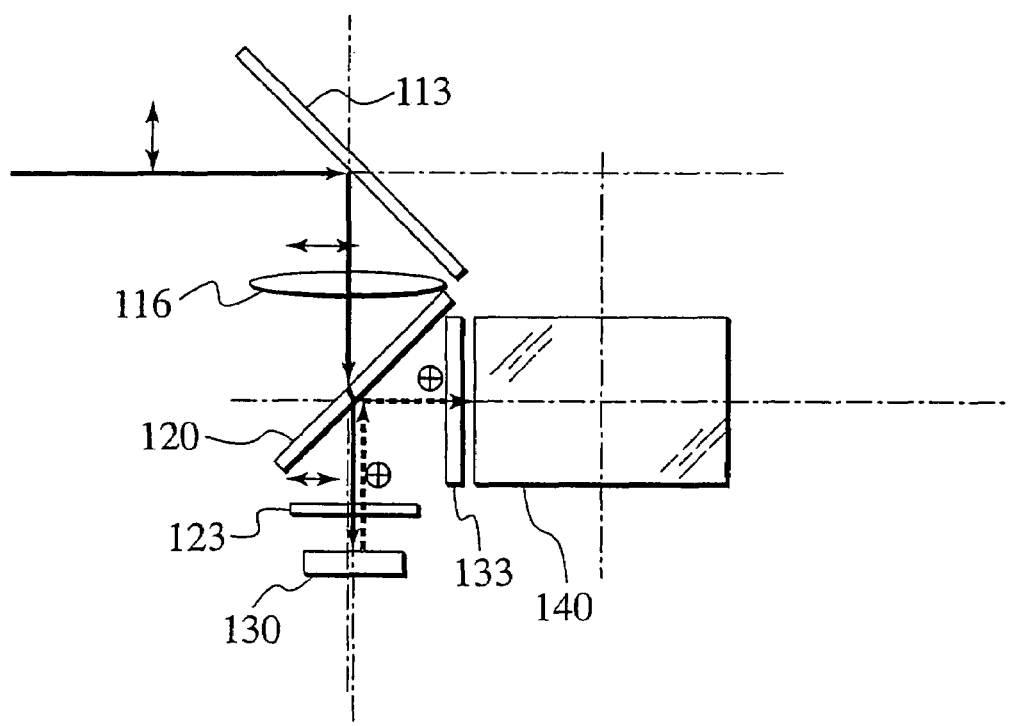

FIG. 7 is a side view showing a modification of the polarizing-separating section including the reflective polarizing plate in the image displaying apparatus of the first embodiment.

Figure 8:
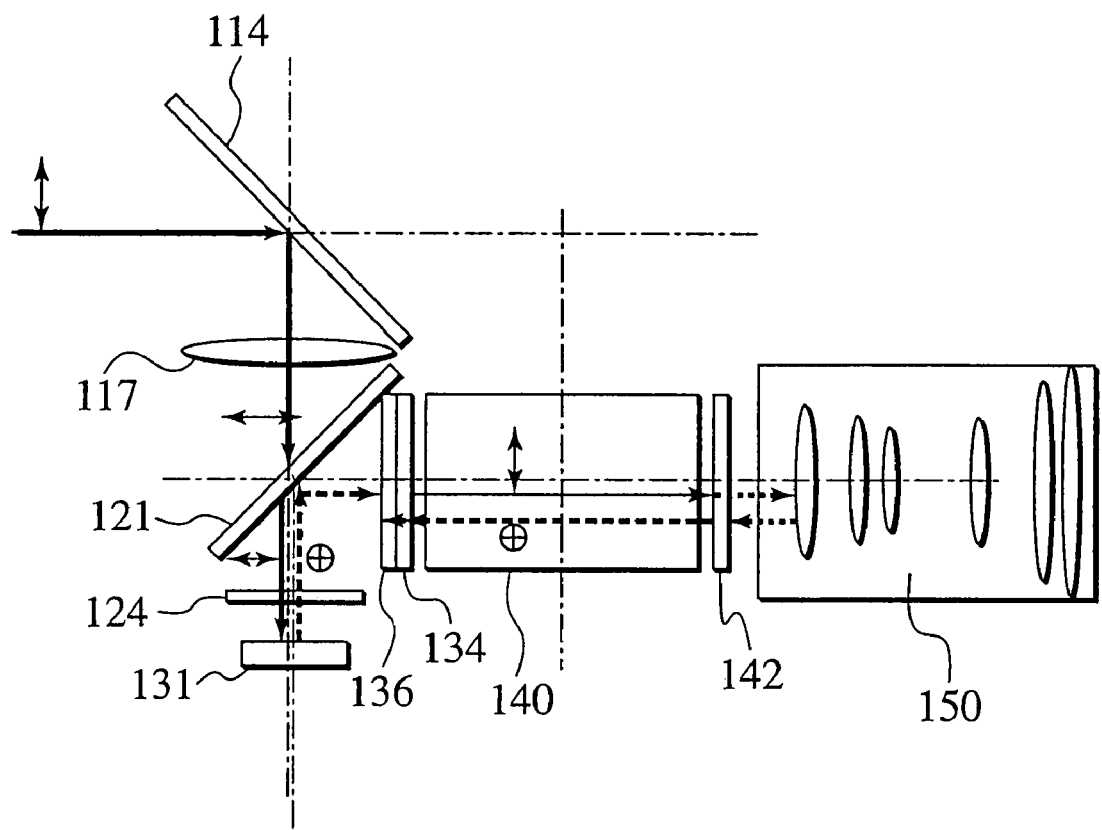

FIG. 8 is a side view showing a beam emanating from the polarizing-separating section, passing through a three-color-combining cross dichroic prism, and entering a projection lens in the image displaying apparatus of the first embodiment.

Figure 9:
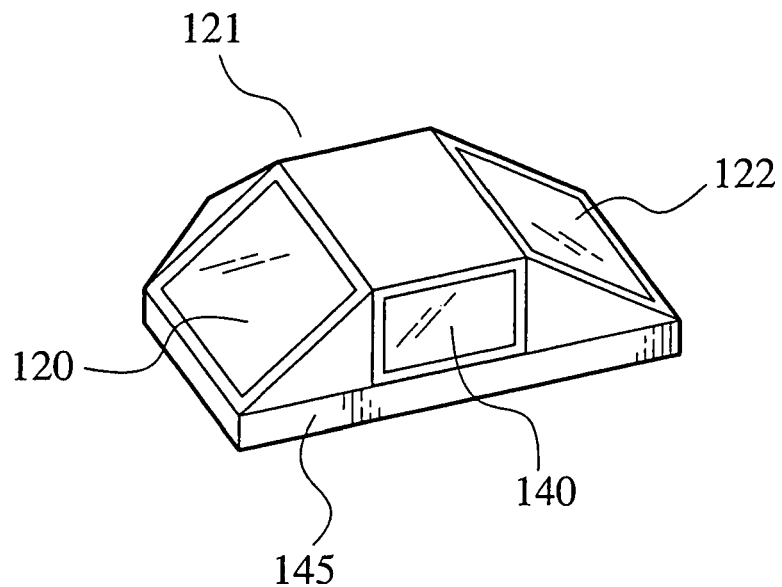

FIG. 9 is a perspective view showing a closed structure including reflective spatial light modulators applicable to the image displaying apparatus of the first embodiment.

Figure 10:
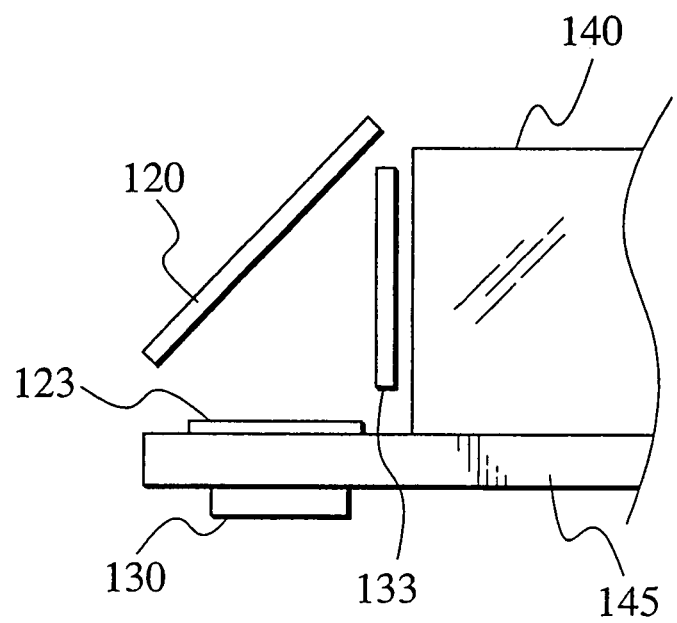

FIG. 10 is a side view showing a reflective spatial light inodulator provided with a cover glass applicable to the image displaying apparatus of the first embodiment.

Figure 11:
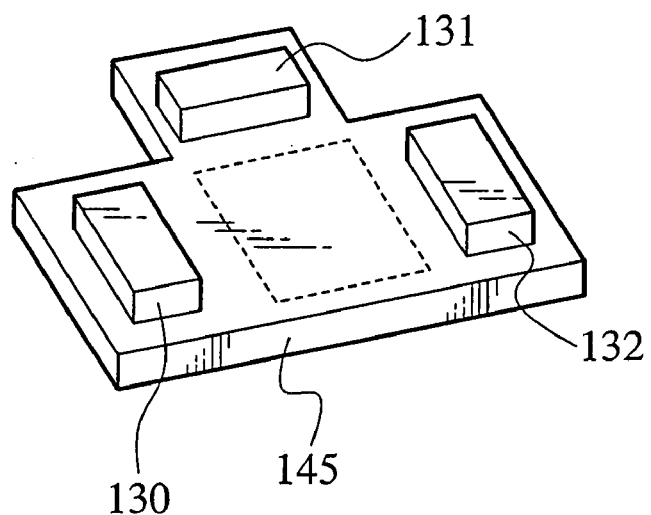

FIG. 11 is a perspective view showing a process of arranging reflective spatial light modulators according to the first embodiment.

Figure 12:
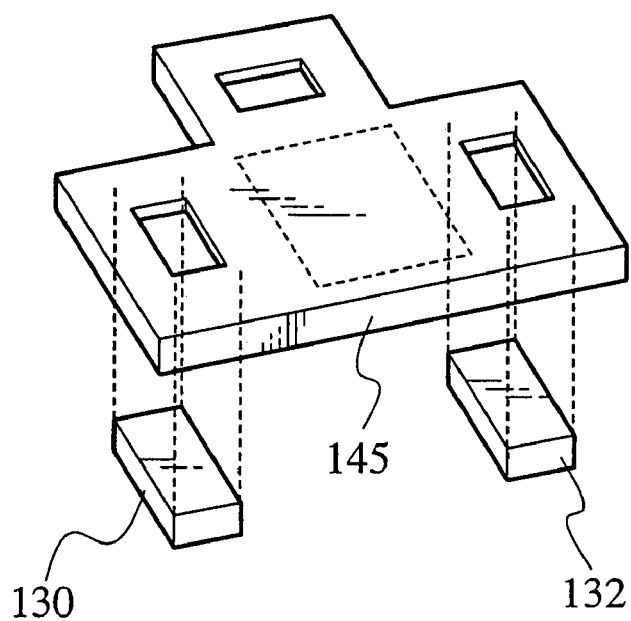

FIG. 12 is a perspective view showing a process of arranging reflective spatial light modulators on a substrate according to the first embodiment.

Figure 13A:
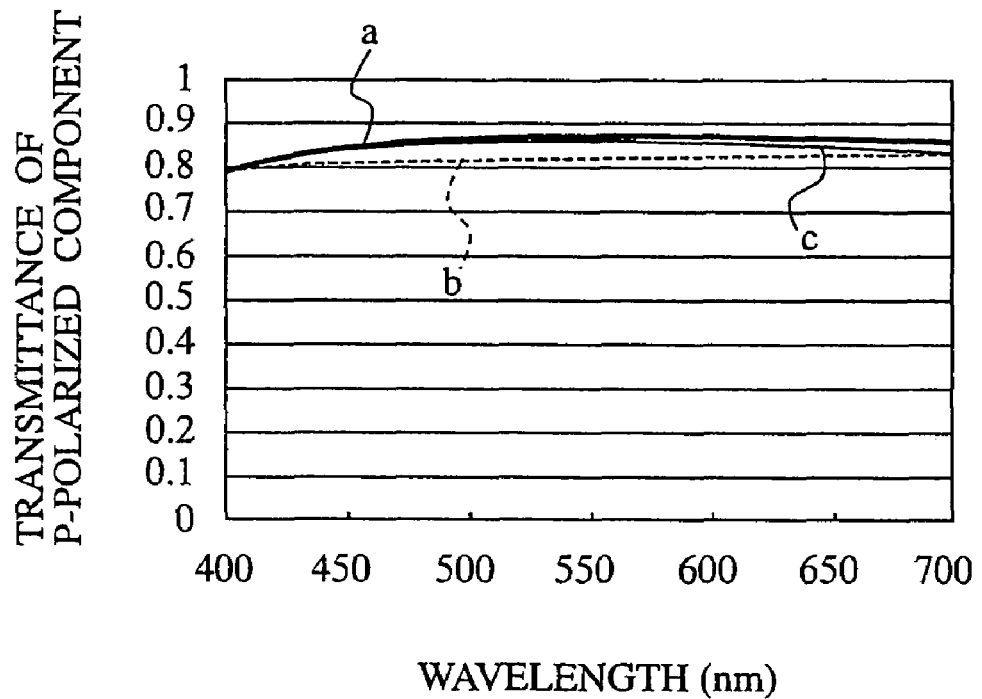

FIG. 13A is a graph showing the polarizing and separating characteristics of a reflective polarizing plate.

Figure 13B:
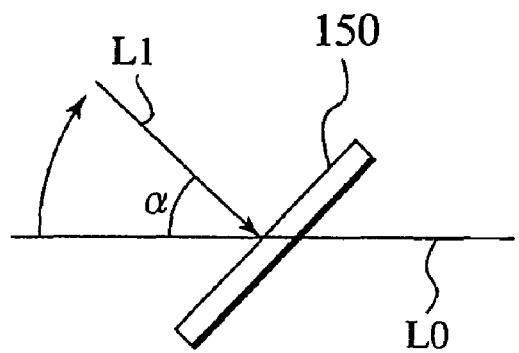

FIG. 13B is a view showing an incident angle α of a beam entering a reflective polarizing plate.

Figure 14:
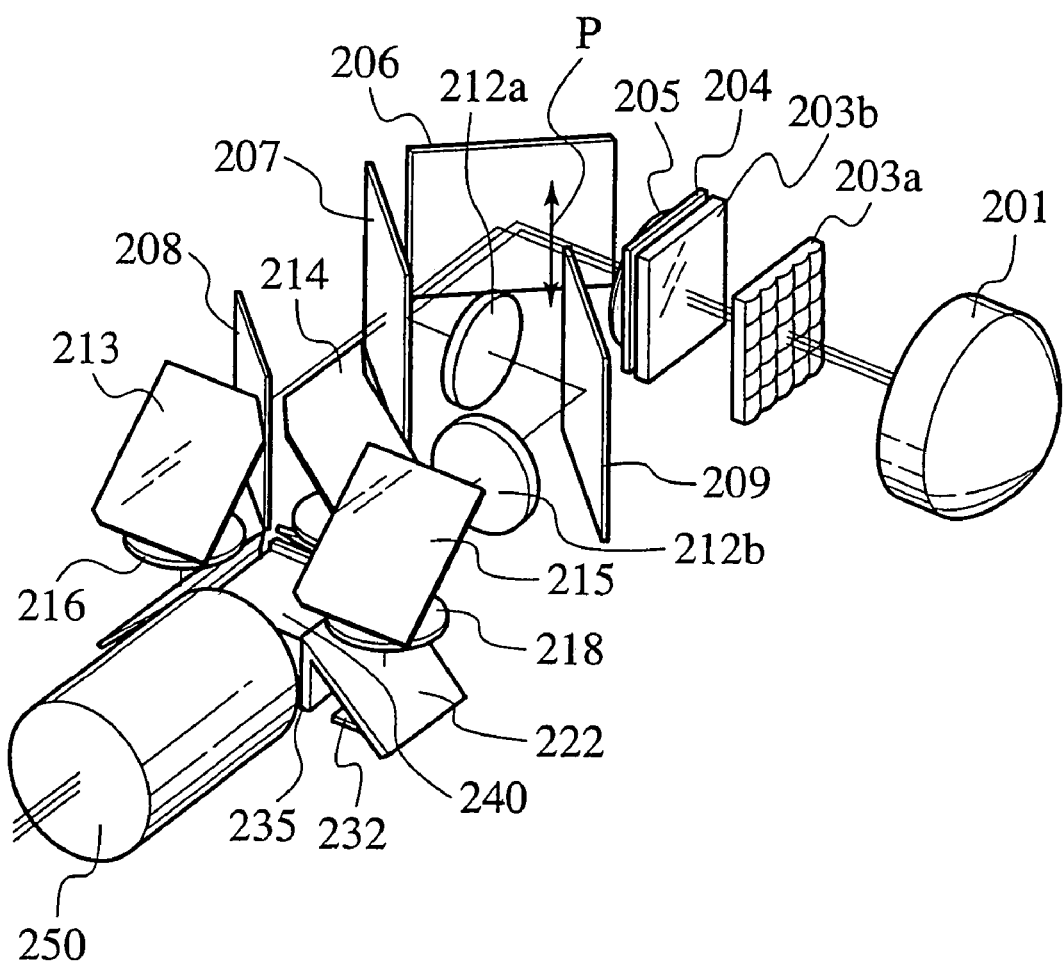

FIG. 14 is a perspective view showing an image displaying apparatus according to a second embodiment of the present invention.

Figure 15:
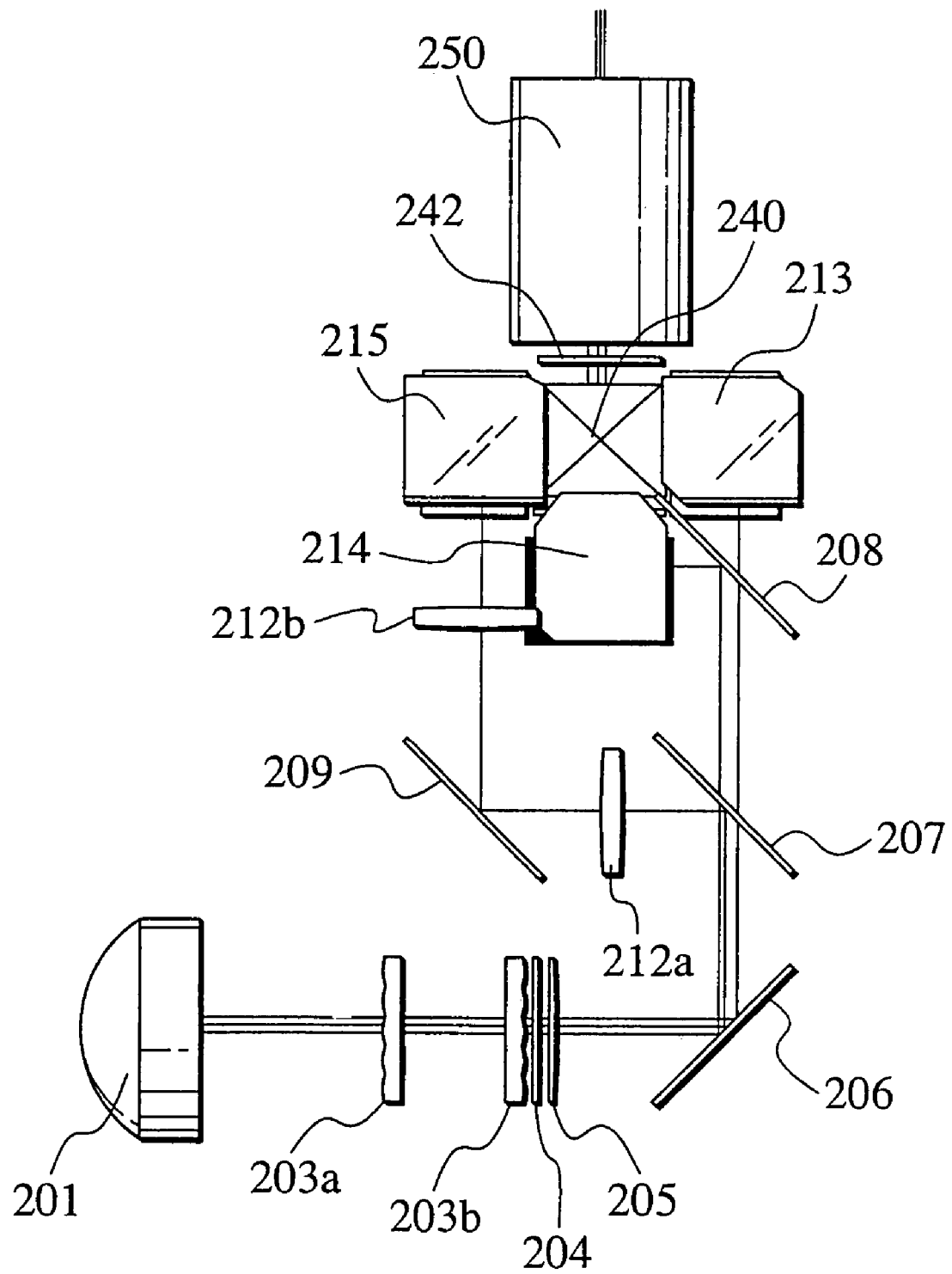

FIG. 15 is a plan view showing the image displaying apparatus of the second embodiment.

Figure 16A:
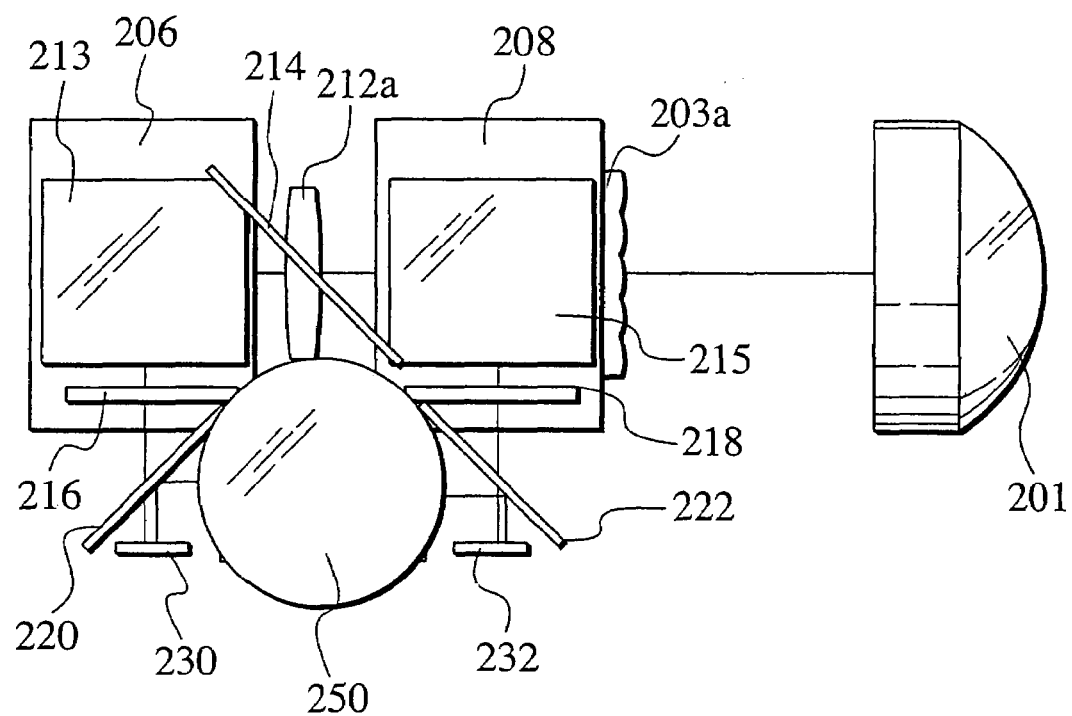

FIG. 16A is a front view showing the image displaying apparatus of the second embodiment.

Figure 16B:
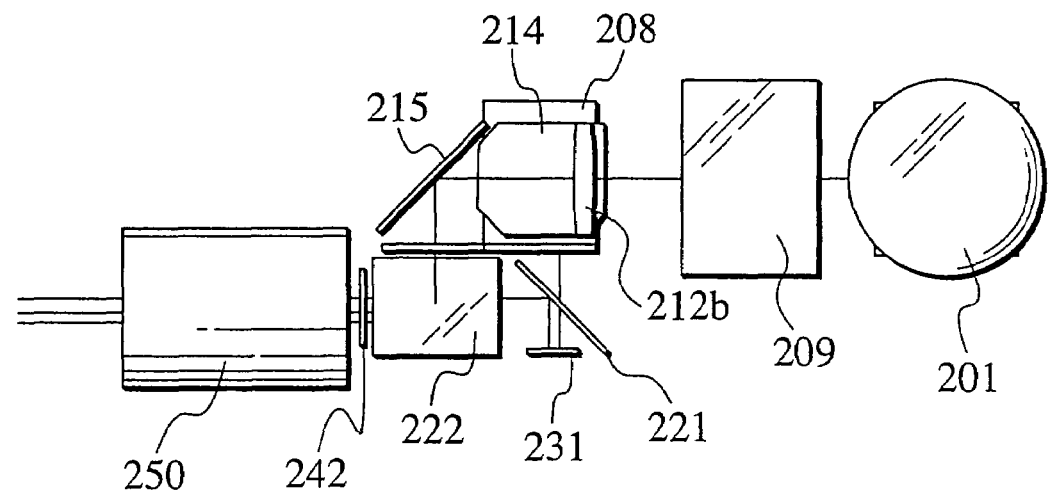

FIG. 16B is a side view showing the image displaying apparatus of the second embodiment.

Figure 17:
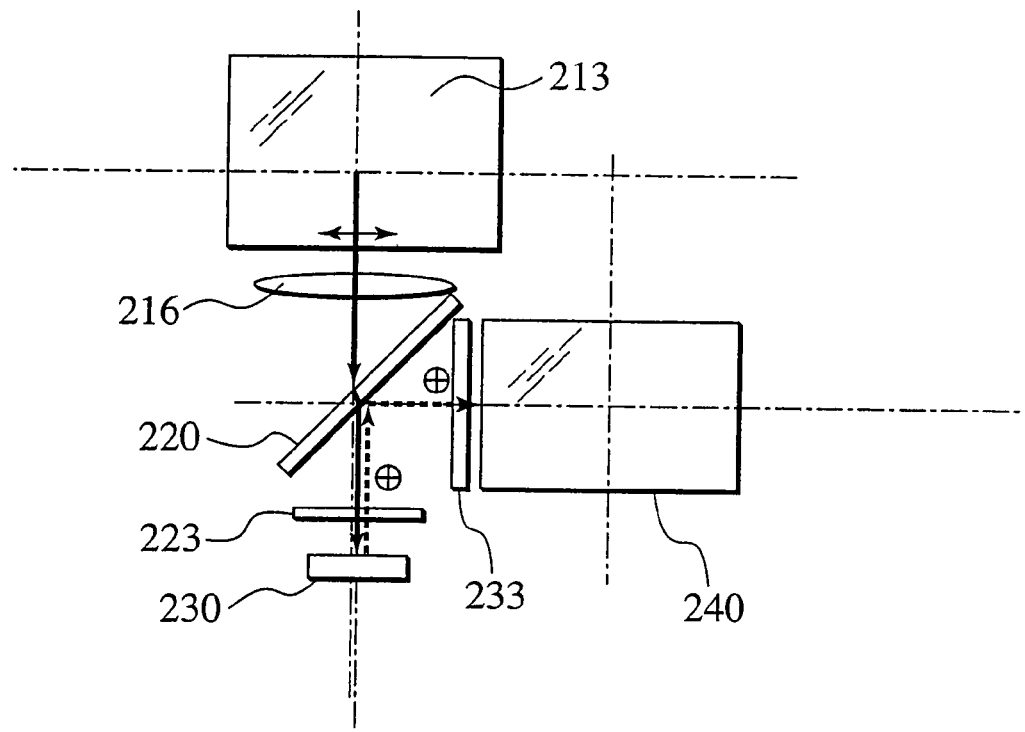

FIG. 17 is a side view showing a polarizing-separating section including a reflective polarizing plate in the image displaying apparatus of the second embodiment.

Figure 18:
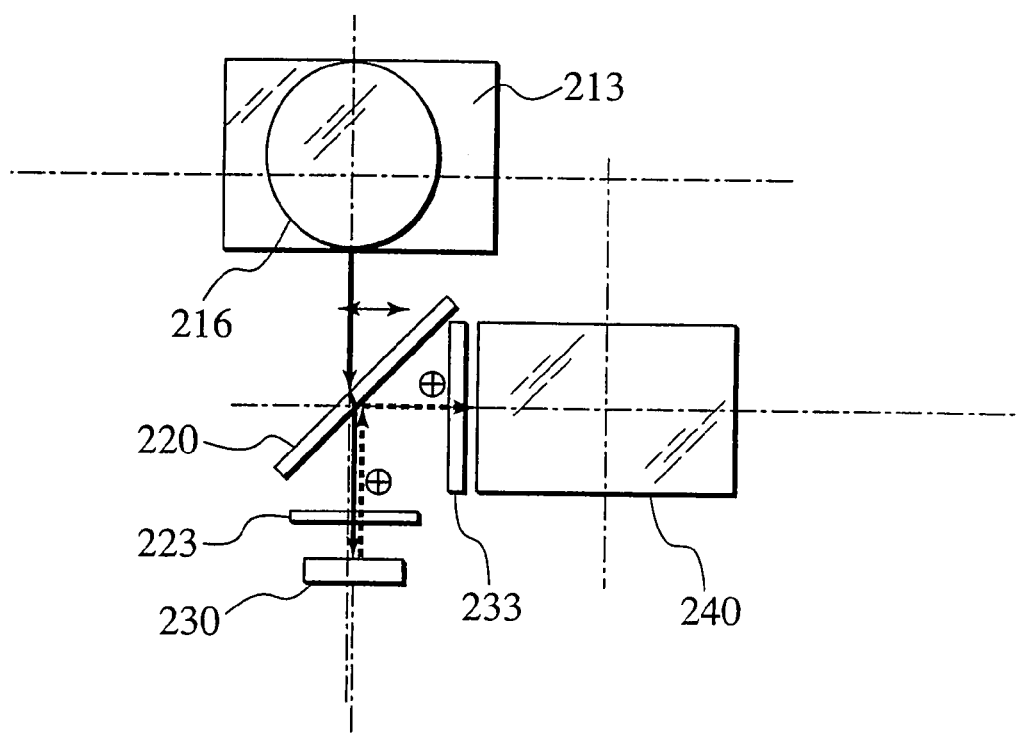

FIG. 18 is a side view showing a modification of the polarizing-separating section including the reflective polarizing plate in the image displaying apparatus of the second embodiment.

Figure 19:
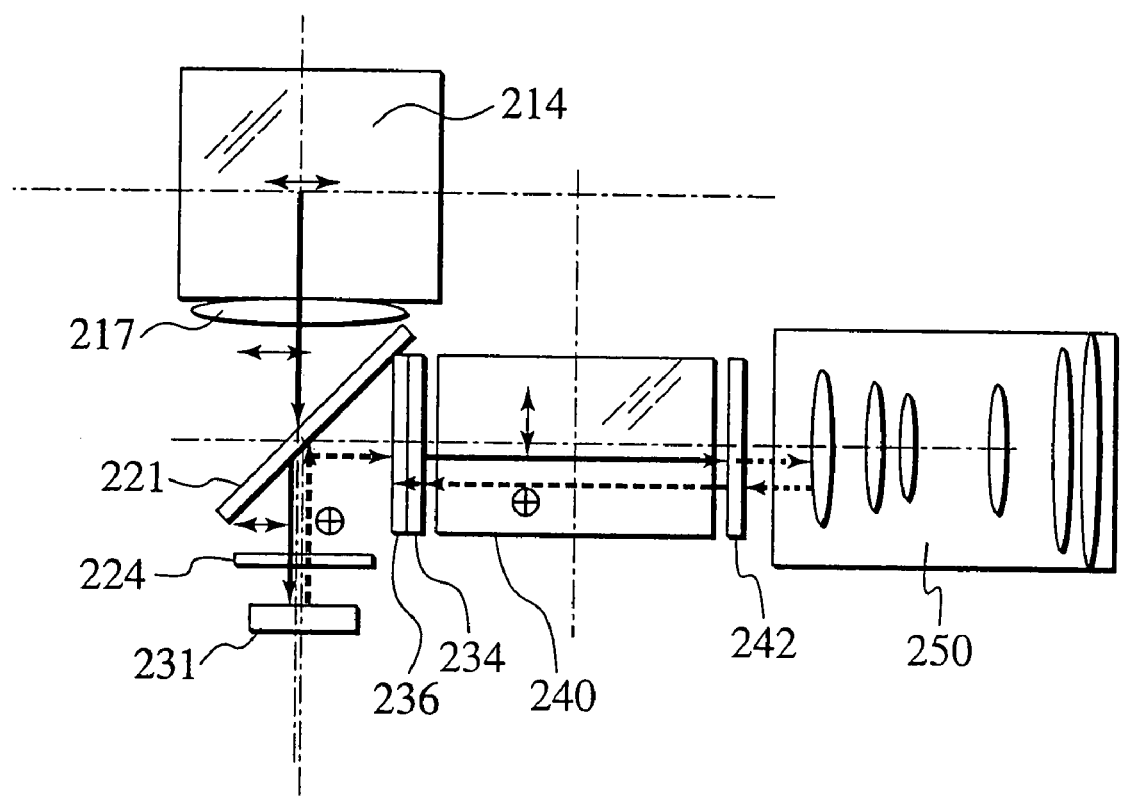

FIG. 19 is a side view showing a beam emanating from the polarizing-separating section, passing through a three-color-combining cross dichroic prism, and entering a projection lens in the image displaying apparatus of the second embodiment.

Figure 20:
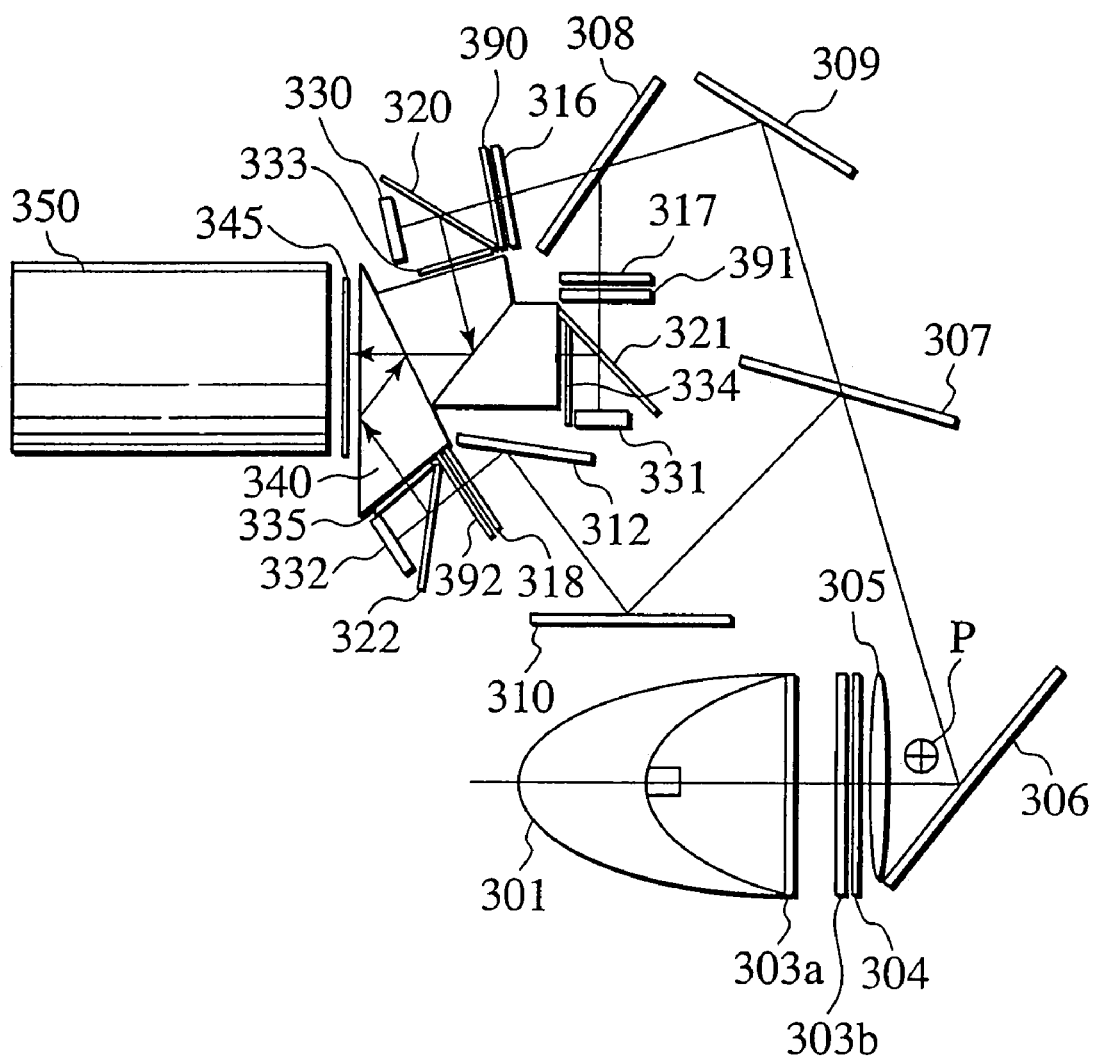

FIG. 20 is a plan view showing an image displaying apparatus employing a color separating-combining optical system according to a third embodiment of the present invention.

Figure 21:
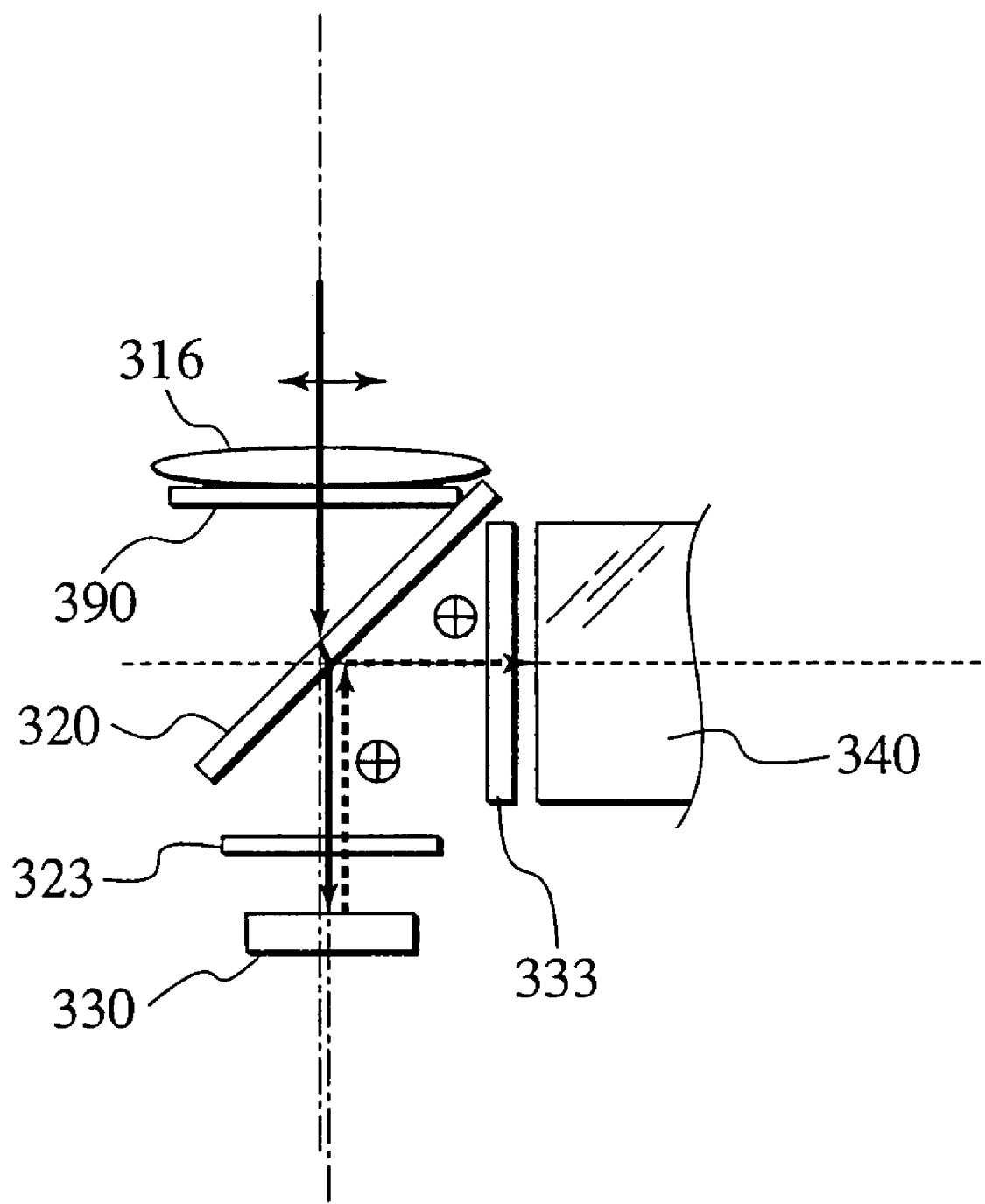

FIG. 21 is a side view showing a polarizing-separating section including a reflective polarizing plate in the image displaying apparatus of the third embodiment.

Figure 22:
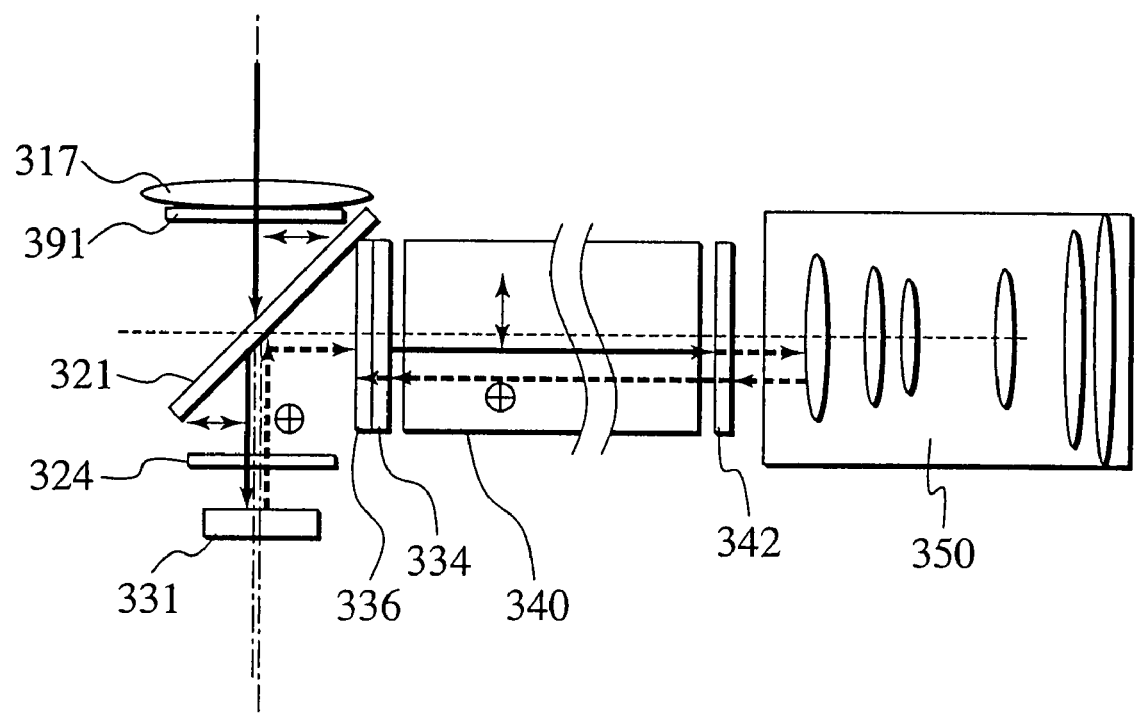

FIG. 22 is a side view showing a beam emanating from the polarizing-separating section, passing through a three-color-combining prism, and entering a projection lens in the image displaying apparatus of the third embodiment.

Figure 23:
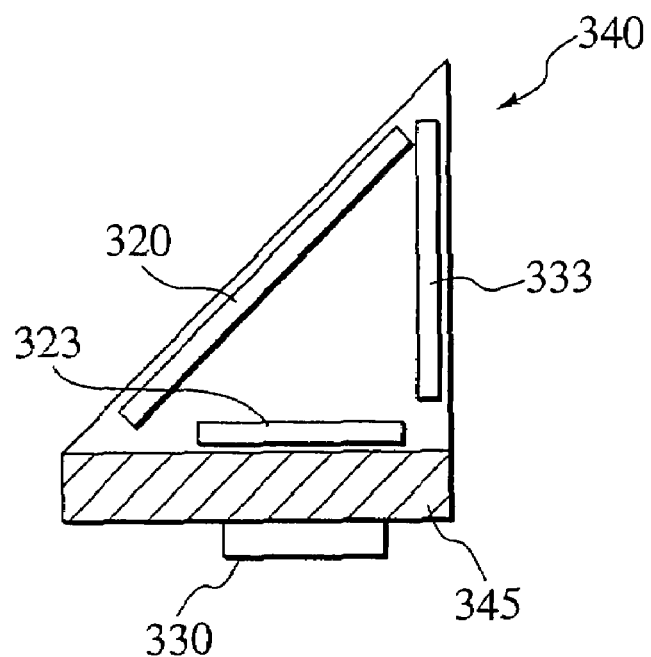

FIG. 23 is a side view showing a reflective spatial light modulator provided with a glass cover applicable to the image displaying apparatus of the third embodiment.

Figure 24:
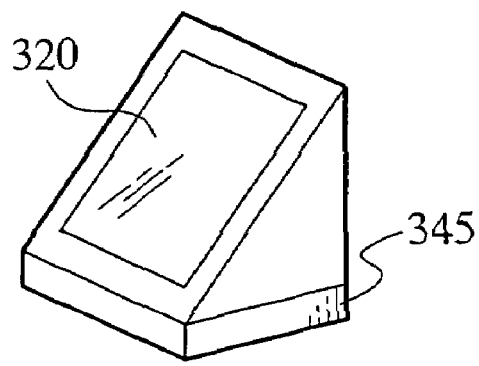

FIG. 24 is a perspective view showing a closed state of the reflective spatial light modulator applicable to the image displaying apparatus of the third embodiment.

DETAILED DESCRIPTION OF THE INVENTION

The present invention now will be described more fully hereinafter with reference to the drawings, in which preferred embodiments of the invention are shown. This invention may, however, be embodied in many different forms and should not be construed as limited to the embodiments set forth herein; rather, these embodiments are provided so that this disclosure will be through and complete, and will fully convey the scope of the invention to those skilled in the art. Like numbers refer to like elements throughout.

Image displaying apparatuses and color separating-combining optical systems according to embodiments of the present invention will be explained in detail with reference to the accompanying drawings.

First Embodiment

FIG. 3 is a perspective view showing an image displaying apparatus according to the first embodiment of the present invention.

FIG. 4 is a plan view showing the image displaying apparatus of the first embodiment.

FIG. 5A is a front view showing the image displaying apparatus of the first embodiment and FIG. 5B is a side view showing the same.

In FIG. 3, the image displaying apparatus of the first embodiment has upper and lower optical systems arranged in upper and lower layers, respectively. The upper optical system has a light source 101 and a color separating optical system for separating a beam emitted from the light source 101 into color beams.

The light source 101 provided for the upper optical system of the image displaying apparatus includes a light emitter or a discharge lamp such as an ultra high performance (UHP) mercury lamp, a metal halide lamp, or a xenon lamp and a paraboloidal reflector arranged on the back side of the light emitter. The light emitter at least emits visible light containing three primary colors, i.e., red (R), green (G), and blue (B). The light is reflected by the reflector to form a substantially parallel beam. A front part (output part) of the light source 101 may be provided with a filter (not shown) to cut ultraviolet and infrared rays.

The beam emitted from the light source 101 is passed through a first fly-eye lens array 103a and is injected into a second fly-eye lens array 103b. These fly-eye lens arrays 103a and 103b form an integrator.

The integrator equalizes an intensity distribution of the beam, and the beam is injected into a polarization converting prism array 104. The prism array 104 has a polarizing-separating prism array and a half-wave plate and is collectively formed in a flat plate shape. The beam injected into the prism array 104 is separated into a p-polarized component and an s-polarized component through polarizing-splitting film faces on the prism array 104. The polarizing-splitting film faces are parallel stripes that are inclined by 45 degrees relative to a principle plane of the prism array 104.

The polarizing-splitting film faces transmit the p-polarized component, which emanates from a back face of the prism array 104, and reflect the s-polarized component. An optical path of the s-polarized component reflected by one polarizing-splitting film face is bent by 90 degrees, is again reflected by the adjacent polarizing-splitting film face by 90 degrees, and exits from the back face of the prism array 104. The area where the s-polarized component emanates (or the area where the p-polarized component emanates) is covered with the half-wave plate. The half-wave plate rotates the orientation of the s-polarized component (or the p-polarized component) by 90 degrees, to align the s-polarized component (or the p-polarized component) with the p-polarized component (or the s-polarized component twice reflected by the polarizing-splitting film faces). Consequently, the beam transmitted through the polarization converting prism array 104 becomes a polarized beam of a predetermined polarized state.

According to the first embodiment, the beam transmitted through the polarization converting prism array 104 is a p-polarized beam as indicated with an arrow mark P in FIG. 3. The polarization converting efficiency of the prism array 104 is not 100%, and therefore, the output beam from the prism array 104 contains several percents to several tens of percents of the s-polarized component.

The beam transmitted through the polarization converting prism array 104 is passed through a first field lens 105 and is reflected by a first cold mirror 106 to bend an optical path of the beam. The beam is then injected into a first dichroic mirror 107 that forms a color separating optical system. The first dichroic mirror 107 transmits one of the three primary colors and reflects the other colors. According to the first embodiment, the first dichroic mirror 107 transmits a red beam (R-beam) and reflects green and blue beams (G- and B-beams).

The R-beam transmitted through the first dichroic mirror 107 is reflected by a second cold mirror 109 and is passed through a second field lens 116 that condenses the beam. Thereafter, the R-beam is reflected by a first steering mirror 113 that bends the optical path of the beam by 90 degrees toward the lower optical system. The R-beam reflected by the first steering mirror 113 is transmitted through a first reflective polarizing plate (wire grid) 120 arranged in the lower optical system and is injected into a reflective spatial light modulator 130 for red (R).

The first reflective polarizing plate 120 is inclined by 45 degrees relative to the optical path of the R-beam and the reflective spatial light modulator 130 is orthogonal to the optical path.

The G- and B-beams reflected by the first dichroic mirror 107 are injected into a second dichroic mirror 108, which transmits, for example, the B-beam and reflects the G-beam. The G-beam reflected by the second dichroic mirror 108 is passed through a third field lens 117 and is reflected by a second steering mirror 114 that bends the optical path of the G-beam by 90 degrees toward the lower optical system. The G-beam reflected by the second steering mirror 114 is transmitted through a second reflective polarizing plate (wire grid) 121 arranged in the lower optical system and is injected into a reflective spatial light modulator 131 for green (G). The second reflective polarizing plate 121 is inclined by 45 degrees relative to the optical path of the G-beam and the reflective spatial light modulator 131 is orthogonal to the optical path.

The B-beam transmitted through the second dichroic mirror 108 is passed through a first relay lens 112a, is reflected by a third cold mirror 110, and is passed through a second relay lens 112b to condense the beam. The B-beam is then reflected by a fourth cold mirror 111, is passed through a sixth field lens 118, and is reflected by a third steering mirror 115 that bends the optical path of the B-beam by 90 degrees toward the lower optical system. The B-beam reflected by the third steering mirror 115 is transmitted through a third reflective polarizing plate (wire grid) 122 arranged in the lower optical system and is injected into a reflective spatial light modulator 132 for blue (B) as shown in FIG. 5A. The third reflective polarizing plate 122 is inclined by 45 degrees relative to the optical path of the B-beam and the reflective spatial light modulator 132 is orthogonal to the optical path.

The second to fourth cold mirrors 109, 110, and 111 may not be cold mirrors. They may be standard metal-film reflective mirrors or dichroic mirrors to reflect respective color light bands.

The reflective polarizing plates 120, 121, and 122 polarize and separate beams to be injected into the reflective spatial light modulators 130, 131, and 132, so that only linearly polarized components of a first polarized state (p-polarized state in this embodiment) may be transmitted and injected into the corresponding reflective spatial light modulators 130, 131, and 132.

Each of the reflective spatial light modulators 130, 131, and 132 may be a liquid crystal display (LCD) element composed of a silicon substrate, a pixel electrode of metal such as aluminum formed on the silicon substrate, and liquid crystals sealed between the silicon substrate and a transparent substrate. Such LCD elements realize high pixel integration, and therefore, are appropriate for displaying high-resolution images. The LCD element allows a circuit structure to be laid on the inner side of the pixel electrode to improve an open area ratio to about 90% to display bright, smooth, fine images.

The reflective spatial light modulators 130, 131, and 132 modulate the incident beams according to image signals and reflect the modulated beams toward the reflective polarizing plates 120, 121, and 122, respectively. The reflective polarizing plates 120, 121, and 122 polarize and separate the modulated-and-reflected beams from the reflective spatial light modulators 130, 131, and 132 and reflect only linearly polarized components of a second polarized state (s-polarized state in this embodiment).

The beams modulated and reflected by the reflective spatial light modulators 130, 131, and 132 and reflected by the reflective polarizing plates 120, 121, and 122 are injected in three directions into the side and back faces of a three-color-combining cross dichroic prism 140 serving as a color combining optical system, as shown in FIG. 4. The prism 140 combines the incident color beams into a composite beam, which is emitted from a front face of the prism 140 and is injected into a projection lens 150 serving as an image forming unit. The beam injected into the projection lens 150 is projected to a screen (not shown) on which the beam forms an actual image.

In this image displaying apparatus, the color separating optical system has a larger effective diameter than the color combining optical system. Accordingly, even if a beam from the light source 101 converges toward the reflective spatial light modulators 130, 131, and 132, the beam from the light source can efficiently be utilized.

As mentioned above, the image displaying apparatus involves the color separating optical system and color combining optical system arranged in upper and lower layers, respectively. In the upper layer, optical paths are routed along the perimeter of the upper layer to separate colors. Then, the separated beams are guided to the polarization and separation section, spatial light modulation section, color combining section, and image forming section of the lower layer. This configuration can minimize the optical system as a whole without sacrificing the routing of optical paths or spaces for optical elements.

According to the image displaying apparatus of this embodiment, the color combining optical system is not limited to the three-color-combining cross dichroic prism 140. It may be a so-called Philips prism. The Philips prism is disclosed in, for example, Japanese Patent No. 2505758 and is a prism having no joints at a part corresponding to a screen. The Philips prism is used as a color separation prism for a so-called three-panel video camera. The Philips prism can combine color beams injected in three directions into a composite beam, which is emitted in one direction and is injected into the projection lens 150 serving as an image forming unit.

The image forming optical system is not limited to the projection lens 150. It may be a virtual image optical system to provide virtual images.

The image displaying apparatus mentioned above employs the reflective polarizing plate as a polarizing-separating unit unlike the image displaying apparatus of the conventional art that employs the cubic polarizing beam splitter prism as a polarizing-separating unit. The image displaying apparatus of the embodiment passes an illumination beam through the reflective polarizing plate to provide a p-polarized beam. The p-polarized beam is modulated and reflected by the reflective spatial light modulator, and the modulated-and-reflected beam is again injected into the reflective polarizing plate, which reflects an s-polarized beam that is used as an image displaying beam. The reflective polarizing plate has a wire grid face to reflect a beam. The wire grid face must sufficiently be flattened to display high-resolution images without astigmatism.

If the reflective polarizing plate is used to transmit, instead of reflect, a beam containing image information, the obliquely arranged reflective polarizing plate will cause astigmatism to deteriorate resolution.

The reflective polarizing plate is disclosed in, for example, U.S. Pat. No. 6,234,634. This reflective polarizing plate is made of a glass plate whose one side is provided with a metal (aluminum) thin film grid having pitches of a fraction of a wavelength. The metal film has excellent heat resistance, and therefore, it is not necessary to sandwich the reflective polarizing plate between glass prisms. Namely, the reflective polarizing plate can be arranged as a thin glass plate element in an optical path. Compared with a prism, the reflective polarizing plate is lightweight and manufacturable at low cost.

FIG. 6 is a side view showing the polarizing-separating section including the reflective polarizing plate.

In FIG. 6, the reflective polarizing plate 120 (121, 122) of the image displaying apparatus has a top face provided with a reflection reducing coat for a 45-degree incident beam. On the reflective spatial light modulator 130 (131, 132) side, the reflective polarizing plate 120 has the wire grid. The reflective polarizing plate 120 transmits a p-polarized beam and reflects an unnecessary s-polarized beam, which is absorbed by an absorber (not shown) so as not to produce stray light. The reflective polarizing plate 120 reflects nearly 100% of an s-polarized beam, and therefore, a highly pure p-polarized beam is injected into the reflective spatial light modulator 130.

As mentioned above, the reflective spatial light modulator 130 (131, 132) is made of a silicon substrate, a pixel electrode of metal such as aluminum formed on the silicon substrate, and liquid crystals sealed between the silicon substrate and a transparent substrate. When electrically selected, the modulator 130 converts (modulates) the polarization phase of a reflected outgoing beam so that it differs from the polarization phase of an incoming beam.

In front of an incident face of the reflective spatial light modulator 130 (131, 132), a wave plate 123 is arranged. The wave plate 123 corrects, in going and returning paths, pre-tilts of the liquid crystals that form a polarizing-modulating layer. Namely, a beam is passed through the wave plate 123, is polarized and modulated in response to an electric signal applied to the pixel electrode of the modulator 130, is reflected by the pixel electrode, is again passed through the wave plate 123, and is injected into the bottom face of the reflective polarizing plate 120 (121, 122). The modulated s-polarized beam is reflected by the metal film of the reflective polarizing plate 120 in a 90-degree direction toward an incident face of the three-color-combining cross dichroic prism 140.

In front of the incident face of the three-color-combining cross dichroic prism 140, there is a polarizing plate 133 serving as a post-polarizer. The polarizing plate 133 corrects the polarized state of the incident beam to the prism 140, to improve the contrast ratio of an image to be displayed. This because the reflected beam from the reflective polarizing plate 120 (121, 122) slightly contains a p-polarized component in addition to the s-polarized component.

The polarizing plate 133 may be made of a polarizing film attached to a substrate. The surface of the polarizing plate 133 is provided with an antireflection coat. The polarizing film may directly be attached to the incident face of the three-color-combining cross dichroic prism 140, to reduce the numbers of parts and unnecessary reflective interfaces.

Although FIG. 6 shows only the polarizing-separating section for a red (R) beam, those for green (G) and blue (B) beams have the same configuration as this.

FIG. 7 is a side view showing a modification of the polarizing-separating section including the reflective polarizing plate in the image displaying apparatus of the first embodiment.

In FIG. 7, the second field lens 116 is arranged between the steering mirror 113 and the reflective polarizing plate 120.

The steering mirror 113 may be made of a reflective polarizing plate serving as a pre-polarizer. In this case, an s-polarized beam is injected into the steering mirror 113 made of the reflective polarizing plate, and a half-wave plate is arranged in an optical path between the steering mirror 113 and the reflective polarizing plate 120. The half-wave plate converts the s-polarized beam into a p-polarized beam which is injected into the reflective polarizing plate 120. This may increase the number of parts but it may realize high-contrast images.

Although FIG. 7 shows only the polarizing-separating section for a red (R) beam, those for green (G) and blue (B) beams have the same configuration as this.

FIG. 8 is a side view showing a beam emanating from the polarizing-separating section, passing through the three-color-combining cross dichroic prism 140, and entering the projection lens 150 in the image displaying apparatus of the first embodiment.

Although FIG. 8 shows only the polarizing-separating section for a red (R) beam, those for green (G) and blue (B) beams have the same configuration as this.

A beam reflected by the steering mirror 114 is passed through the field lens 117, reflective polarizing plate 121, and wave plate 123 and is injected into the reflective spatial light modulator 131. The modulator 131 polarizes, modulates, and reflects the beam. The reflected beam returns to the reflective polarizing plate 121, which reflects an s-polarized component of the beam. The reflected s-polarized component is injected into the three-color-combining cross dichroic prism 140.

Due to a reason concerning wavelength characteristics, it is preferable for the three-color-combining cross dichroic prism 140 to transmit a p-polarized G-beam therethrough. This is advantageous in terms of color purity and light usage efficiency. Accordingly, for the G-beam, there is arranged a half-wave plate 136 in front of a polarizing plate 134 that is placed in front of the prism 140. The half-wave plate 136 rotates a polarized plane by 90 degrees, and therefore, the G-beam polarizing plate 134 is arranged to transmit a p-polarized beam.

The G-beam polarizing plate 134 may be arranged to transmit an s-polarized beam. In this case, the half-wave plate 136 is arranged behind the polarizing plate 134 so that a p-polarized beam is injected into the three-color-combining cross dichroic prism 140.

In the image displaying apparatus of this embodiment, the illuminating optical system from the light source 101 to the color separating optical system must provide uniform color and intensity for images to display. To achieve this, an incident beam to a multilayer film of, for example, the three-color-combining cross dichroic prism 140 must have no difference in incident angles irrespective of incident points, and a beam that is in-plane uniform must be injected into the liquid crystals of the reflective spatial light modulator 131. For this, the illumination optical system and image forming optical system employ each a telecentric optical system in which a main beam travels in parallel with an optical axis.

In the three-color-combining cross dichroic prism 140, an R-beam is reflected by an R-reflection dichroic face, a B-beam by a B-reflection dichroic face, and a G-beam is transmitted through these faces, and the three color beams are combined into a composite beam which is injected into the projection lens 150.

In FIG. 8, the three-color-combining cross dichroic prism 140 receives a beam transmitted through the polarizing plate 134, and therefore, the contrast ratio and illuminance of a displayed image will be unaffected by a slight polarization rotation due to double refraction in the glass of the prism 140. Accordingly, the prism 140 can be made of a widely used inexpensive glass material such as BK7. Such a glass material is easy to obtain, inexpensive, and lightweight.

As shown in FIG. 8, a quarter-wave plate 142 may be arranged between the three-color-combining cross dichroic prism 140 and the projection lens 150. The quarter-wave plate 142 prevents unwanted ghost light that is caused by little reflection from the surfaces of lens elements of the projection lens 150 returning to the reflective spatial light modulator 131 and being again reflected toward the screen.

More precisely, as indicated with dotted lines in FIG. 8, a p-polarized G-beam transmitted through the reflective polarizing plate 121 is modulated by the reflective spatial light modulator 131 into an s-polarized G-beam. The reflective polarizing plate 121 reflects the s-polarized component, and the polarizing plate 134 removes an unwanted p-polarized component. Then, the half-wave plate 136 converts the s-polarized beam into a p-polarized beam which is transmitted through the three-color-combining cross dichroic prism 140. The beam is passed through the quarter-wave plate 142 and becomes a circularly polarized beam which is injected into the projection lens 150. Although the surface of each of the lens elements of the projection lens 150 is provided with an antireflection film, there is little reflection that forms a circularly polarized beam turning in an opposite direction from the incident beam and returns to the quarter-wave plate 142. The quarter-wave plate 142 changes the opposite circularly polarized beam into a linearly polarized beam which is an s-polarized beam orthogonal to the incident beam. The s-polarized beam becomes a p-polarized beam after passing through the half-wave plate 136 and is absorbed by the polarizing plate 134.

This action also occurs on the R- and B-beams. In this way, unwanted reflected components to form ghost are removed, and a clear image without ghost is displayed on the screen.

The reflective polarizing plates 120, 121, and 122 are unable to entirely reflect s-polarized components. They partly absorb s-polarized beams to generate heat. Accordingly, if strong beams are injected into the reflective polarizing plates 120, 121, and 122, the temperatures thereof increase by about several tens of degrees to one hundred degrees relative to an ambient temperature. Then, it is necessary to cool the reflective polarizing plates 120, 121, and 122.

The reflective polarizing plates 120, 121, and 122 release heat to bases to which the plates 120, 121, and 122 are attached. In addition, each side of the plates 120, 121, and 122 faces a space which can be used to pass cooling air to cool the plates.

The reflective spatial light modulators 130, 131, and 132 also generate heat to be cooled. According to the embodiment, the back face of each reflective spatial light modulator never interferes with other optical parts, and therefore, there is a sufficient space to attach a heat sink to the back face of the modulator to cool the modulator. In addition, the modulators 130, 131, and 132 are arranged on the same substrate, and therefore, a single fan may sufficiently cool the modulators.

The glass substrates of the reflective polarizing plates 120, 121, and 122 are selected not to cause uneven illuminance due to double refraction. The glass substrates may be made of a material having good heat radiation (for example, quartz having a thermal conductivity of $k \geqq 1$ W/m·K), a material having a relatively low optical elasticity constant of, for example, $\beta \leqq 2$ nm/cm/$10^5$Pa, or a material having a low thermal expansion coefficient (for example, Neoceram® or quartz), those which have expansion coefficients existing in the range between $-10 \times 10^{-7}$/K and $10 \times 10^{-7}$/K under the temperature between 30° C. and 80° C.).

Specifically, glasses having low thermal expansion coefficients as material of glass substrates for the reflective polarizing plates 120, 121, and 122 allow to prevent shading (unevenness) on a projection screen caused by double refraction due to the accumulation of thermal stress, the deterioration of resolution or the declination of registration on a projection screen with respect to three primary colors caused by the thermal deformation or distortion of wire grid.

FIG. 9 is a perspective view showing a closed structure containing the reflective spatial light modulators in the image displaying apparatus of the first embodiment.

In the image displaying apparatus, foreign matter such as dust on the reflective spatial light modulators may produce shadows on a displayed image to degrade the image. To avoid dust, it is preferable to tightly close the area from the reflective polarizing plates 120, 121, and 122 to the three-color-combining cross dichroic prism 140, as shown in FIG. 9. In this case, the prism 140 and modulators are arranged on a substrate 145 and are covered with the polarizing plates 120, 121, and 122 with each gap being closed to form a tightly closed structure.

FIG. 10 is a side view showing the reflective spatial light modulator 130 provided with a cover glass in the image displaying apparatus of the first embodiment.

In the image displaying apparatus of this embodiment, the reflective polarizing plate 120 (121, 122) has a downwardly oriented reflective face as shown in FIG. 10. This reflective face hardly collects foreign matter that may degrade a displayed image.

Any foreign matter setting out of an image forming area on the polarizing plate 120 will not deteriorate a displayed image. Accordingly, only the reflective spatial light modulator 130 may be covered with a cover glass 145 to close only the surface of the modulator 130 as shown in FIG. 10. The substrate of the wave plate 123 may serve as the cover glass. The thickness of the cover glass 145 may be about 4 mm so that the focus of foreign matter on the surface of the cover glass 145 may blur and become unclear on the screen. In this case, a space between the reflective polarizing plate 120 and the cover glass 145 may pass cooling air to sufficiently cool the polarizing plate 123 serving as a post polarizer.

Further, sealing the triangular structure comprising the reflective polarizing plate 120, the polarizing plate 133 and the reflective spatial light modulators 130, passing cooling air along the side of the polarizing plate 133 facing to the prism 140, hence overheating of or burning on the polarizing plate 133 may be prevented.

FIG. 11 is a perspective view showing a process of arranging the reflective spatial light modulators 130, 131, and 132 in the image displaying apparatus of the first embodiment.

As mentioned above, this embodiment arranges the reflective spatial light modulators 130, 131, and 132 substantially on the same plane. Namely, they can be installed on a common substrate 145 as shown in FIG. 11. On the substrate 145, the three-color-combining cross dichroic prism 140 is attached, and a positional relationship among the modulators 130, 131, and 132 and prism 140 is fixed. In FIG. 11, a dotted line indicates the position where the prism 140 is attached.

FIG. 12 is a perspective view showing a process of arranging the reflective spatial light modulators 130, 131, and 132 on a substrate in the image displaying apparatus of the first embodiment.

According to this process, the three-color-combining cross dichroic prism 140 is attached to a predetermined position on the surface of a substrate 145. The substrate 145 is provided with apertures corresponding to the primary colors, respectively. To the bottom face of the substrate 145, the reflective spatial light modulators 130, 131, and 132 are attached by adhesive or soldering.

On the substrate 145, the reflective polarizing plates 120, 121, and 122 are arranged to form an integrated body relative to the projection lens 150. This configuration can adjust color registrations to one another.

The substrate 145 may be made of metal such as aluminum, magnesium, stainless steel, or iron, polycarbonate containing glass fibers, glass, or ceramics having a small thermal expansion coefficient. The thermal expansion coefficient of the material of the substrate 145 may be equalized or approximated to that of the three-color-combining cross dichroic prism 140 to prevent a positional shift of the prism 140 from the substrate 145 and improve reliability and durability.

The top of each aperture of the substrate 145 is covered with a cover glass or a wave plate to prevent dust and defocus foreign matter in the image forming optical system.

Unlike a polarizing beam splitter prism, the wave plate needs no correction for characteristic deterioration caused by skewed rays. The wave plate is selected from those having a small quantity of retardation to correct a pre-tilt of liquid crystals in the reflective spatial light modulator. For example, the wave plate may be a retardation film made of polycarbonate-based resin or olefin resin, anisotropic crystals such as quartz crystals, and the like. The retardation film may be attached to a glass substrate. The retardation film may be attached to a substrate having a small optical elasticity constant, or may be sandwiched between both-side substrates by adhesive.

FIG. 13A is a graph showing the polarizing and separating characteristics of the reflective polarizing plate in the image displaying apparatus of the first embodiment. FIG. 13B is a view showing an incident angle α between the optical axis of a reflective polarizing plate 150 and an incident beam L1.

The polarizing and separating characteristics of the reflective polarizing plate employed by the image displaying apparatus of this embodiment will be explained. FIG. 13A shows the wavelength dependence of transmittance of a p-polarized component with an incident angle α of an incident beam to the reflective polarizing plate. In FIG. 13A, "a" represents an incident angle α of 0 degrees, "b" of −15 degrees, and "c" of +15 degrees. The incident angle α is formed between an incident beam to the reflective polarizing plate and an optical axis. The incident face of the reflective polarizing plate is inclined by 45 degrees relative to the optical axis.

In FIG. 13A, the wavelength dependence of transmittance of a p-polarized beam entering the reflective polarizing plate is very small and stable in a visible wavelength zone.

Accordingly, employing the reflective polarizing plate instead of a conventional polarizing beam splitter prism can display an image that is bright and has good color reproducibility. Unlike the polarizing beam splitter prism, the reflective polarizing plate is a single polarizing-separating plate, and therefore, is light in weight. In the image displaying apparatus, the reflective polarizing plate hardly absorbs a beam emitted from a light source. This helps maintain the quality of a displayed image against double refraction.

In the image displaying apparatus, an optical system having an f-value of about 2.4 will not substantially influence the polarizing-separating characteristics of the reflective polarizing plate. When the reflective polarizing plate is used to transmit a p-polarized beam and reflect an s-polarized beam, the reflected beam may contain an unwanted p-polarized beam to deteriorate the contrast ratio of a displayed image. Accordingly, the image displaying apparatus of the embodiment arranges the polarizing plates 133 and 134 on the output side of the reflective polarizing plates, to remove unwanted polarized beams.

The polarizing plates 133 and 134 may be those used for LCD elements. Many of polarizing plates mass-produced and actually used for LCD elements are made by dyeing a base film (polyvinyl alcohol, PVA) with dichroic material such as iodine and organic dyes or by making the base film adsorb the dichroic material and by extending and aligning the dyed base film to provide dichroism.

The PVA polarizing layer is sandwiched between TAC (triacetate cellulose) layers to form a polarizing film, which is attached to a glass substrate with an adhesive material. The polarizing plate based on an absorption dichroism principle absorbs a polarized component in the same direction as the aligning direction of the dichroic dyes and transmits the other polarized component among the orthogonally polarized components of an incident beam.

The polarizing plate absorbs heat. For heat resistance and heat radiation, it is preferable to employ a substrate made of, for example, quartz or sapphire having good heat conductivity. To improve a light usage ratio and prevent deterioration in the quality of a displayed image due to unwanted reflection at an interface, an air interface of the polarizing plate must have a reflection reduction coat. The polarization and antireflection characteristics of the polarizing plate are preferably optimized for each of the R, G, and B colors.

The polarizing plate may be made of a one-sided film. It is difficult, however, to flatten the surface of the film in wavelength order. If the surface of the film is nonplanar, it will cause wave aberration to deteriorate resolution. Accordingly, to realize a high resolution, the polarizing film must be sandwiched between optically polished flat substrates (made of white plate glass, optical glass, quartz, crystal, or sapphire) with irregularities filled with adhesives.

The polarizing plate may be a reflective polarizing plate. The reflective polarizing plate is superior to the absorption polarizing plate in heat resistance and light resistance. However, the reflective polarizing plate separates and reflects an unwanted polarized beam instead of absorbing the same. Accordingly, the unwanted component may reach the screen through the projection lens 150, to deteriorate the quality of a displayed image. To prevent this, the reflective polarizing plate must be provided with a reflection reduction coat.

The polarizing plate may be a reflective polarizing plate made of cholesteric liquid crystals, for example, a double refraction polymer layered product disclosed in U.S. Pat. No. 5,486,949.

As explained above, the image displaying apparatus according to the first embodiment employs the first to third reflective polarizing plates for the three reflective spatial light modulators and makes the effective diameter of the color separating optical system greater than that of the color combining optical system.

The image displaying apparatus employs the reflective polarizing plates to polarize and separate beams that are injected into the reflective spatial light modulators. Even if the f-value of the color separating optical system is lowered to display bright images, the contrast ratios of displayed images will never decrease. The reflective polarizing plates realize an optical system that is compact, lightweight, and easy to manufacture.

The image displaying apparatus employs the reflective polarizing plates instead of polarizing beam splitter prisms of large specific weight, and therefore, can greatly reduce the total weight thereof. Compared with the conventional polarizing beam splitter prism, the reflective polarizing plate has a wider angular characteristic to display bright, uniform, high-contrast images.

In the image displaying apparatus, the effective diameter of the color separating optical system is greater than that of the color combining optical system. Even if a beam emitted from the light source converges toward the reflective spatial light modulators, the beam can efficiently be used.

In the image displaying apparatus, the color separating optical system may employ a plurality of dichroic mirrors to optimize optical paths in the color separating optical system.

In the image displaying apparatus, the optical axes of beams from the steering mirrors to the reflective spatial light modulators may be parallel to one another, and the color separating optical system and color combining optical system are arranged in upper and lower layers, respectively, to efficiently use a given space.

Namely, the image displaying apparatus has a two-layer optical system in which optical paths are guided along the perimeter of the upper layer for color separation, and beams are guided from the upper layer to the lower layer that includes a polarizing and separating section, spatial light modulating section, color combining section, and image formation section. The optical system is compact without forcibly routing optical paths and without jamming optical elements into a narrow space. The backs of the reflective polarizing plates and reflective spatial light modulators that need heat radiation never interfere with one another, and they face the outside of the optical system. This makes it easy to form a cooling structure.

In the image displaying apparatus, the color combining optical system may be a cross dichroic prism to minimize the size of the optical system.

In the image displaying apparatus, the reflective spatial light modulators are arranged at three positions around the cross dichroic prism on a flat substrate that supports the cross dichroic prism, so that the beam incident faces of the modulators are substantially on the same plane. This configuration makes it easy to cool the modulators and prevent foreign matter from attaching to the modulators. In addition, this configuration improves the positioning accuracy and reliability of pixels.

Although the reflective spatial light modulators are arranged in the lower layer according to this embodiment, it is possible to arrange the color separating optical system in the lower layer and the color combining optical system in the upper layer with the reflective spatial light modulators being in the upper layer. Since hot air ascends, high-temperature parts arranged in the lower layer may heat optical parts arranged in the upper layer or the image displaying apparatus as a whole. If the reflective spatial light modulators are arranged in the upper layer, an increase in the temperature of the image displaying apparatus as a whole may be suppressed.

In the image displaying apparatus, optical paths from the reflective spatial light modulators to the image forming unit involve no obliquely arranged substrates, and instead, involve the reflection faces of the reflective polarizing plates. This configuration realizes the best use of the reflective spatial light modulators in displaying high-resolution images.

In this way, the image displaying apparatus according to the first embodiment is capable of maintaining the contrast ratios of displayed images even if the f-value of the optical system thereof is lowered to provide bright images, efficiently utilizing a beam from the light source, minimizing the size and weight of the optical system, and realizing easy manufacturing.

Second Embodiment

An image displaying apparatus according to the second embodiment of the present invention will be explained. Parts and arrangements of the second embodiment other than those explained below are the same as those of the first embodiment, and therefore, the same parts and arrangements are not explained again.

FIG. 14 is a perspective view showing the image displaying apparatus according to the second embodiment.

FIG. 15 is a plan view showing the image displaying apparatus of the second embodiment.

FIG. 16A is a front view showing the image displaying apparatus of the second embodiment, and FIG. 16B is a side view showing the same.

In FIG. 14, the image displaying apparatus has upper and lower optical systems arranged in two layers. The upper optical system includes a light source 201 and a color separating optical system to separate a beam from the light source 201 into color beams.

The light source 201 provided for the upper optical system of the image displaying apparatus includes a light emitter or a discharge lamp such as an ultra high performance (UHP) mercury lamp, metal halide lamp, or xenon lamp and a paraboloidal reflector arranged on the back side of the light emitter. The light emitter at least emits visible light containing three primary colors, i.e., red (R), green (G), and blue (B). The light is reflected by the reflector, to substantially form a parallel beam. A front part (output part) of the light source 201 may be provided with a filter (not shown) to cut ultraviolet and infrared rays.

The beam emitted from the light source 201 is passed through a first fly-eye lens array 203*a* and is injected into a second fly-eye lens array 203*b*. These fly-eye lens arrays 203*a* and 203*b* form an integrator.

The integrator equalizes an intensity distribution of the beam, and the beam is injected into a polarization converting prism array 204. The prism array 204 has a polarizing-separating prism array and a half-wave plate and is formed in a flat plate shape as a whole. The beam injected into the prism array 204 is separated into a p-polarized component and an s-polarized component through polarizing-splitting film faces on the prism array 204. The polarizing-splitting film faces are parallel stripes that are inclined by 45 degrees relative to a principle plane of the prism array 204.

The polarizing-splitting film faces transmit the p-polarized component, which emanates from a back face of the prism array 204, and reflect the s-polarized component. An optical path of the s-polarized component reflected by one polarizing-splitting film face is bent by 90 degrees, is again reflected by the adjacent polarizing-splitting film face by 90 degrees, and emanates from the back face of the prism array 204. The area where the s-polarized component emanates (or the area where the p-polarized component emanates) is provided with the half-wave plate. The half-wave plate rotates the polarization direction of the s-polarized component (or the p-polarized component) by 90 degrees, to make the polarization direction thereof the same as that of the p-polarized component (or the s-polarized component twice reflected by the polarizing-splitting film faces). Consequently, the beam transmitted through the polarization converting prism array 204 becomes a beam polarized in a given direction.

According to the second embodiment, the beam transmitted through the polarization converting prism array 204 is a p-polarized beam as indicated with an arrow mark P in FIG. 14. The polarization converting efficiency of the prism array 204 is not 100%, and therefore, the output beam from the prism array 204 contains several percents to several tens of percents of the s-polarized component.

The beam transmitted through the polarization converting prism array 204 is passed through a first field lens 205 and is reflected by a first cold mirror 206 to bend an optical path of the beam. The beam is then injected into a first dichroic mirror 207 that forms a color separating optical system. The first dichroic mirror 207 transmits one of the three primary colors and reflects the other colors. According to the second embodiment, the first dichroic mirror 207 transmits, for example, R- and G-beams and reflects a B-beam.

The R- and G-beams transmitted through the first dichroic mirror 207 are injected into a second dichroic mirror 208, which transmits, for example, the R-beam and reflects the G-beam. The R-beam transmitted through the second dichroic mirror 208 is reflected by a first steering mirror 213 that bends the optical path of the R-beam by 90 degrees toward the lower optical system. The R-beam reflected by the first steering mirror 213 is transmitted through a second field lens 216, is transmitted through a first reflective polarizing plate (wire grid) 220 arranged in the lower optical system, and is injected into a reflective spatial light modulator 230 for red (R) as shown in FIG. 16A. The first reflective polarizing plate 220 is inclined by 45 degrees relative to the optical path of the R-beam and the reflective spatial light modulator 230 is orthogonal to the optical path.

The G-beam reflected by the second dichroic mirror 208 is reflected by a second steering mirror 214 that bends the optical path of the beam by 90 degrees toward the lower optical system. The G-beam reflected by the second steering mirror 214 is transmitted through a third field lens 217, is transmitted through a second reflective polarizing plate (wire grid) 221 arranged in the lower optical system, and is injected into a reflective spatial light modulator 231 for green (G) as shown in FIG. 16B. The second reflective polarizing plate 221 is inclined by 45 degrees relative to the optical path of the G-beam and the reflective spatial light modulator 231 is orthogonal to the optical path.

The B-beam reflected by the first dichroic mirror 207 is passed through a first relay lens 212a, is reflected by a second cold mirror 209, and is passed through a second relay lens 212b to condense the beam as shown in FIG. 15. The B-beam is then reflected by a third steering mirror 215 that bends the optical path of the B-beam by 90 degrees toward the lower optical system. The B-beam reflected by the third steering mirror 215 is transmitted through a fourth field lens 218, is transmitted through a third reflective polarizing plate (wire grid) 222 arranged in the lower optical system, and is injected into a reflective spatial light modulator 232 for blue (B) as shown in FIG. 14. The third reflective polarizing plate 222 is inclined by 45 degrees relative to the optical path of the B-beam and the reflective spatial light modulator 232 is orthogonal to the optical path.

The second cold mirror 209 is not necessary to be a cold mirror. It may be a standard metal-film reflective mirror or dichroic mirror to reflect a corresponding color light band.

The reflective polarizing plates 220, 221, and 222 polarize and separate beams to be injected into the reflective spatial light modulators 230, 231, and 232, so that only linearly polarized components of a first polarized state (p-polarized state in this embodiment) may be transmitted and injected into the corresponding reflective spatial light modulators 230, 231, and 232.

Each of the reflective spatial light modulators 230, 231, and 232 may be a liquid crystal display (LCD) element composed of a silicon substrate, a pixel electrode of metal such as aluminum formed on the silicon substrate, and liquid crystals sealed between the silicon substrate and a transparent substrate. Such LCD elements realize high pixel integration, and therefore, are appropriate for displaying high-resolution images. The LCD element allows a circuit structure to be laid on the inner side of the pixel electrode to improve an open area ratio to about 90% to display bright, smooth, fine images.

The reflective spatial light modulators 230, 231, and 232 modulate the incident beams according to image signals and reflect the modulated beams toward the reflective polarizing plates 220, 221, and 222, respectively. The reflective polarizing plates 220, 221, and 222 polarize and separate the modulated-and-reflected beams from the reflective spatial light modulators 230, 231, and 232 and reflect only linearly polarized components of a second polarized state (s-polarized state in this embodiment).

The beams modulated and reflected by the reflective spatial light modulators 230, 231, and 232 and reflected by the reflective polarizing plates 220, 221, and 222 are injected in three directions into the side and back faces of a three-color-combining cross dichroic prism 240 serving as a color combining optical system, as shown in FIG. 15. The prism 240 combines the incident color beams into a composite beam, which is emitted from a front face of the prism 240 and is injected into a projection lens 250 serving as an image forming optical system. The beam injected into the projection lens 250 is projected to a screen (not shown) on which the beam forms an actual image.

In this image displaying apparatus, the color separating optical system has a larger effective diameter than the color combining optical system. Accordingly, even if a beam from the light source 201 converges toward the reflective spatial light modulators 230, 231, and 232, the beam from the light source can efficiently be utilized.

As mentioned above, the image displaying apparatus involves the color separating optical system and color combining optical system arranged in upper and lower layers, respectively. In the upper layer, optical paths are routed along the perimeter of the upper layer to separate colors. Then, the separated beams are guided to the polarization and separation section, spatial light modulation section, color combining section, and image forming section of the lower layer. This configuration can minimize the optical system as a whole without sacrificing the routing of optical paths or spaces for optical elements.

In the color separating optical system of this image displaying apparatus, the first and third steering mirrors 213 and 215 are substantially oriented in the same direction. The optical axis of a beam injected into the second steering mirror 214 is orthogonal to the optical axes of beams injected into the first and third steering mirrors 213 and 215. This configuration of the optical paths is effective to reduce the size of the color separating optical system in the image displaying apparatus.

According to the image displaying apparatus of this embodiment, the color combining optical system is not limited to the three-color-combining cross dichroic prism 240. It may be a so-called Philips prism. The Philips prism is disclosed in, for example, Japanese Publication No. 2505758 and is a prism having no joints at a part corresponding to a screen. The Philips prism is used as a color separation prism for a so-called three-panel video camera. The Philips prism can combine color beams injected in three directions into a composite beam, which is emitted in one direction and is injected into the projection lens 250 serving as an image forming optical system.

The image forming unit is not limited to the projection lens 250. It may be a virtual image optical system to provide virtual images.

The image displaying apparatus mentioned above employs the reflective polarizing plate as a polarizing-separating unit unlike the image displaying apparatus of the conventional art that employs the cubic polarizing beam splitter prism as a polarizing-separating unit. The image displaying apparatus of the embodiment passes an illumination beam through the reflective polarizing plate to provide a p-polarized beam. The p-polarized beam is modulated and reflected by the reflective spatial light modulator, and the modulated-and-reflected beam is again injected into the reflective polarizing plate, which reflects an s-polarized beam that is used as an image displaying beam. The reflective polarizing plate has a wire grid face to reflect a beam. The wire grid face must sufficiently be flattened to display high-resolution images without astigmatism.

If the reflective polarizing plate is used to transmit, instead of reflect, a beam containing image information, the obliquely arranged reflective polarizing plate will cause astigmatism to deteriorate resolution.

The reflective polarizing plate is disclosed in, for example, U.S. Pat. No. 6,234,634. This reflective polarizing plate is made of a glass plate whose one side is provided with a metal (aluminum) thin film grid having pitches of a fraction of a wavelength. The metal film has excellent heat resistance, and therefore, it is not necessary to sandwich the reflective polarizing plate between glass prisms. Namely, the reflective polarizing plate can be arranged as a thin glass plate element in an optical path. Compared with a prism, the reflective polarizing plate is lightweight and manufacturable at low cost.

FIG. 17 is a side view showing the polarizing-separating section including the reflective polarizing plate.

In FIG. 17, the reflective polarizing plate 220 (221, 222) of the image displaying apparatus has a top face provided with a reflection reducing coat for a 45-degree incident beam. On the reflective spatial light modulator 230 (231, 232) side, the reflective polarizing plate 220 has the wire grid. The reflective polarizing plate 220 transmits a p-polarized beam and reflects an unnecessary s-polarized beam, which is absorbed by an absorber (not shown) so as not to produce stray light.

The reflective polarizing plate 220 reflects nearly 100% of an s-polarized beam, and therefore, a highly pure p-polarized beam is injected into the reflective spatial light modulator 230.

As mentioned above, the reflective spatial light modulator 230 (231, 232) is made of a silicon substrate, a pixel electrode of metal such as aluminum formed on the silicon substrate, and liquid crystals sealed between the silicon substrate and a transparent substrate. When electrically selected, the modulator 230 converts (modulates) the polarization phase of a reflected outgoing beam so that it differs from the polarization phase of an incoming beam.

In front of an incident face of the reflective spatial light modulator 230 (231, 232), a wave plate 223 is arranged. The wave plate 223 corrects, in going and returning paths, pre-tilts of the liquid crystals that form a polarizing-modulating layer. Namely, a beam is passed through the wave plate 223, is polarized and modulated in response to an electric signal applied to the pixel electrode of the modulator 230, is reflected by the pixel electrode, is again passed through the wave plate 223, and is injected into the bottom face of the reflective polarizing plate 220 (221, 222). The modulated s-polarized beam is reflected by the metal film of the reflective polarizing plate 220 in a 90-degree direction toward an incident face of the three-color-combining cross dichroic prism 240.

In front of the incident face of the three-color-combining cross dichroic prism 240, there is a polarizing plate 233 serving as a post-polarizer. The polarizing plate 233 corrects the polarized state of the incident beam to the prism 240, to improve the contrast ratio of an image to be displayed. This is because the reflected beam from the reflective polarizing plate 220 (221, 222) slightly contains a p-polarized component in addition to the s-polarized component.

The polarizing plate 233 may be made of a polarizing film attached to a substrate. The surface of the polarizing plate 233 is provided with an antireflection coat. The polarizing film may directly be attached to the incident face of the three-color-combining cross dichroic prism 240, to reduce the numbers of parts and unnecessary reflective interfaces.

Although FIG. 17 shows only the polarizing-separating section for a red (R) beam, those for green (G) and blue (B) beams have the same configuration as this.

FIG. 18 is a side view showing a modification of the polarizing-separating section including the reflective polarizing plate in the image displaying apparatus of the second embodiment.

In FIG. 18, the second field lens 216 is arranged to transmit a beam before the beam is injected into the steering mirror 213.

The steering mirror 213 may be made of a reflective polarizing plate serving as a pre-polarizer. In this case, an s-polarized beam is injected into the steering mirror 213 made of the reflective polarizing plate, and a half-wave plate is arranged in an optical path between the steering mirror 213 and the reflective polarizing plate 220. The half-wave plate converts the s-polarized beam into a p-polarized beam which is injected into the reflective polarizing plate 220. This may increase the number of parts but it may realize high-contrast images.

Although FIG. 18 shows only the polarizing-separating section for a red (R) beam, those for green (G) and blue (B) beams have the same configuration as this.

FIG. 19 is a side view showing a beam emanating from the polarizing-separating section, passing through the three-color-combining cross dichroic prism 240, and entering the projection lens 250 in the image displaying apparatus of the second embodiment.

Although FIG. 19 shows only the polarizing-separating section for a red (R) beam, those for green (G) and blue (B) beams have the same configuration as this.

A beam reflected by the steering mirror 214 is passed through the field lens 217, reflective polarizing plate 221, and wave plate 223 and is injected into the reflective spatial light modulator 231. The modulator 231 polarizes, modulates, and reflects the beam. The reflected beam returns to the reflective polarizing plate 221, which reflects an s-polarized component of the beam. The reflected s-polarized component is injected into the three-color-combining cross dichroic prism 240.

Due to a reason concerning wavelength characteristics, it is preferable for the three-color-combining cross dichroic prism 240 to transmit a p-polarized G-beam therethrough. This is advantageous in terms of color purity and light usage efficiency. Accordingly, for the G-beam, there is arranged a half-wave plate 236 in front of a polarizing plate 234 that is placed in front of the prism 240. The half-wave plate 236 rotates a polarized plane by 90 degrees, and therefore, the G-beam polarizing plate 234 is arranged to transmit a p-polarized beam.

The G-beam polarizing plate 234 may be arranged to transmit an s-polarized beam. In this case, the half-wave plate 236 is arranged behind the polarizing plate 234 so that a p-polarized beam is injected into the three-color-combining cross dichroic prism 240.

In the image displaying apparatus of this embodiment, the illuminating optical system from the light source 201 to the color separating optical system must provide uniform color and intensity for images to display. To achieve this, an incident beam to a multilayer film of, for example, the three-color-combining cross dichroic prism 240 must have no difference in incident angles irrespective of incident points, and a beam that is in-plane uniform must be injected into the liquid crystals of the reflective spatial light modulator 231. For this, the illumination optical system and image forming optical system employ each a telecentric optical system in which a main beam travels in parallel with an optical axis.

In the three-color-combining cross dichroic prism 240, an R-beam is reflected by an R-reflection dichroic face, a B-beam by a B-reflection dichroic face, and a G-beam is transmitted through these faces, and the three color beams are combined into a composite beam which is injected into the projection lens 250.

In FIG. 19, the three-color-combining cross dichroic prism 240 receives a beam transmitted through the polarizing plate 234, and therefore, the contrast ratio and illuminance of a displayed image will be unaffected by a slight polarization rotation due to double refraction in the glass of the prism 240. Accordingly, the prism 240 can be made of a widely used inexpensive glass material such as BK7. Such a glass material is easy to obtain, inexpensive, and lightweight.

As shown in FIG. 19, a quarter-wave plate 242 may be arranged between the three-color-combining cross dichroic prism 240 and the projection lens 250. The quarter-wave plate 242 prevents unwanted ghost light that is caused by little reflection from the surfaces of lens elements of the projection lens 250 returning to the reflective spatial light modulator 231 and being again reflected toward the screen.

More precisely, as indicated with dotted lines in FIG. 19, a polarized G-beam transmitted through the reflective polarizing plate 221 is modulated by the reflective spatial light modulator 231 into an s-polarized G-beam. The reflective polarizing plate 221 reflects the s-polarized component, and the polarizing plate 234 removes unwanted p-polarized component. Then, the half-wave plate 236 converts the s-polarized beam into a p-polarized beam which is transmitted through the three-color-combining cross dichroic prism 240. The beam is passed through the quarter-wave plate 242 and becomes a circularly polarized beam which is injected into the projection lens 250. Although the surface of each of the lens elements of the projection lens 250 is provided with an antireflection film, there is little reflection that forms a circularly polarized beam turning in an opposite direction from the incident beam and returns to the quarter-wave plate 242. The quarter-wave plate 242 changes the opposite circularly polarized beam into a linearly polarized beam which is an s-polarized beam orthogonal to the incident beam. The s-polarized beam becomes a p-polarized beam after passing through the half-wave plate 236 and is absorbed by the polarizing plate 234.

This action also occurs on the R- and B-beams. In this way, unwanted reflected components to form ghost are removed, and a clear image without ghost is displayed on the screen.

The reflective polarizing plates 220, 221, and 222 are unable to entirely reflect s-polarized components. They partly absorb s-polarized beams to generate heat. Accordingly, if strong beams are injected into the reflective polarizing plates 220, 221, and 222, the temperatures thereof increase by about several tens of degrees to two hundred degrees relative to an ambient temperature. Then, it is necessary to cool the reflective polarizing plates 220, 221, and 222.

The reflective polarizing plates 220, 221, and 222 release heat to bases to which the plates 220, 221, and 222 are attached. In addition, each side of the plates 220, 221, and 222 faces a space which can be used to pass cooling air to cool the plates.

The reflective spatial light modulators 230, 231, and 232 also generate heat to be cooled. According to the embodiment, the back face of each reflective spatial light modulator never interferes with other optical parts, and therefore, there is a sufficient space to attach a heat sink to the back face of the modulator to cool the modulator. In addition, the modulators 230, 231, and 232 are arranged on the same substrate, and therefore, a single fan may sufficiently cool the modulators.

The glass substrates of the reflective polarizing plates 220, 221, and 222 are selected not to cause uneven illuminance due to double refraction. The glass substrates may be made of a material having good heat radiation (for example, quartz having a thermal conductivity of $k \geq 1$ W/m·K), a material having a relatively low optical elasticity constant of, for example, $\beta \leq 2$ nm/cm/$10^5$Pa, or a material having a low thermal expansion coefficient (for example, Neoceram® or quartz, those which have expansion coefficients existing in the range between $-10 \times 10^{-7}$/K and $10 \times 10^{-7}$/K under the temperature between 30° C. and 80° C.).

Specifically, glasses having low thermal expansion coefficients as material of glass substrates for the reflective polarizing plates 220, 221, and 222 allow to prevent shading (unevenness) on a projection screen caused by double refraction due to the accumulation of thermal stress, the deterioration of resolution or the declination of registration on a projection screen with respect to three primary colors caused by the thermal deformation or distortion of wire grid.

Like the first embodiment, it is preferable for the second embodiment to prepare a closed structure for a section starting from the reflective polarizing plates 220, 221, and 222 to the three-color-combining cross dichroic prism 240. Namely, like FIG. 9, the three-color-combining cross dichroic prism 240 and reflective spatial light modulators 230, 231, and 232 are arranged on a substrate 245, and they are covered with the reflective polarizing plates 220, 221, and 222 with gaps between them being closed to form a tightly closed structure.

In addition, like FIG. 10; the reflective faces of the reflective polarizing plates 220, 221, and 222 are oriented downward.

Like the first embodiment shown in FIG. 11, the image displaying apparatus of the second embodiment arranges the reflective spatial light modulators 230, 231, and 232 on a substantially same plane, positions them on the common substrate 245, and attaches them together.

Like the first embodiment shown in FIG. 12, a manufacturing process of the image displaying apparatus according to the second embodiment attaches the three-color-combining cross dichroic prism 240 to a predetermined position on the surface of the substrate 245. The substrate 245 is provided with apertures corresponding to the primary colors, respectively. To the bottom face of the substrate 245, the reflective spatial light modulators 230, 231, and 232 are attached by adhesive or soldering. On the substrate 245, the reflective polarizing plates 220, 221, and 222 are arranged to form an integrated body relative to the projection lens 250.

The polarizing and separating characteristics of each reflective polarizing plate according to the second embodiment are the same as those of the first embodiment shown in FIGS. 13A and 13B. The materials and characteristics of the optical parts according to the second embodiment may be the same as those of the first embodiment.

As explained above, the image displaying apparatus according to the second embodiment employs the first to third reflective polarizing plates for the three reflective spatial light modulators, respectively.

The image displaying apparatus employs the reflective polarizing plates to polarize and separate beams that are injected into the reflective spatial light modulators. Even if the f-value of the color separating optical system is lowered to display bright images, the contrast ratios of displayed images will never decrease. The reflective polarizing plates realize an optical system that is compact, lightweight, and easy to manufacture.

The image displaying apparatus arranges the color separating optical system and the color combining optical system in upper and lower layers, respectively, to improve space efficiency in the image displaying apparatus. The second embodiment optimizes optical paths of beams injected into the steering mirrors, to minimize the size of the optical system.

In the image displaying apparatus, the color separating optical system may employ a plurality of dichroic mirrors to optimize optical paths in the color separating optical system.

In the image displaying apparatus, the color combining optical system may be a cross dichroic prism to minimize the size of the optical system.

The beam incident faces of the reflective spatial light modulators may be arranged on a substantially same plane. This makes it easy to cool the modulators and prevent foreign matter from attaching to the modulators.

Although the reflective spatial light modulators are arranged in the lower layer according to this embodiment, it is possible to arrange the color separating optical system in the lower layer and the color combining optical system in the upper layer with the reflective spatial light modulators being in the upper layer. Since hot air ascends, high-temperature parts arranged in the lower layer may heat optical parts arranged in the upper layer or the image displaying apparatus as a whole. If the reflective spatial light modulators are arranged in the upper layer, an increase in the temperature of the image displaying apparatus as a whole may be suppressed.

In this way, the image displaying apparatus according to the second embodiment is capable of maintaining the contrast ratios of displayed images even if the f-value of the optical system thereof is lowered to provide bright images, efficiently utilizing a beam from the light source, minimizing the size and weight of the optical system, and realizing easy manufacturing.

Third Embodiment

A color separating-combining optical system according to the third embodiment of the present invention and an image displaying apparatus employing the same will be explained. Parts and arrangements of the third embodiment other than those explained below are the same as those of the first embodiment, and therefore, the same parts and arrangements are not explained again.

FIG. 20 is a plan view showing the image displaying apparatus employing the color separating-combining optical system according to the third embodiment.

In FIG. 20, optical elements of the color separating-combining optical system are arranged in a single layer. The color separating optical system separates a beam from a light source 301 into color beams.

The light source 301 includes a light emitter or a discharge lamp such as an ultra high performance (UHP) mercury lamp, metal halide lamp, or xenon lamp and a paraboloidal reflector arranged on the back side of the light emitter. The light emitter at least emits visible light containing three primary colors, i.e., red (R), green (G), and blue (B). The light is reflected by the reflector, to substantially form a parallel beam. A front part (output part) of the light source 301 may be provided with a filter (not shown) to cut ultraviolet and infrared rays.

The beam emitted from the light source 301 is passed through a first fly-eye lens array 303a and is injected into a second fly-eye lens array 303b. These fly-eye lens arrays 303a and 303b form an integrator.

The integrator equalizes an intensity distribution of the beam, and the beam is injected into a polarization converting prism array 304. The prism array 304 has a polarizing-separating prism array and a half-wave plate and is formed in a flat plate shape as a whole. The beam injected into the prism array 304 is separated into a p-polarized component and an s-polarized component through polarizing-splitting film faces on the prism array 304. The polarizing-splitting film faces are parallel stripes that are inclined by 45 degrees relative to a principle plane of the prism array 304.

The polarizing-splitting film faces transmit the p-polarized component, which emanates from a back face of the prism array 304, and reflect the s-polarized component. An optical path of the s-polarized component reflected by one polarizing-splitting film face is bent by 90 degrees, is again reflected by the adjacent polarizing-splitting film face by 90 degrees, and emanates from the back face of the prism array 304. The area where the s-polarized component emanates (or the area where the p-polarized component emanates) is provided with the half-wave plate. The half-wave plate rotates the polarization direction of the s-polarized component (or the p-polarized component) by 90 degrees, to make the polarization direction thereof the same as that of the p-polarized component (or the s-polarized component twice reflected by the polarizing-splitting film faces). Consequently, the beam transmitted through the polarization converting prism array 304 becomes a beam polarized in a given direction.

According to the third embodiment, the beam transmitted through the polarization converting prism array 304 is a p-polarized beam as indicated with an arrow mark P in FIG. 20. The polarization converting efficiency of the prism array 304 is not 100%, and therefore, the output beam from the prism array 304 contains several percents to several tens of percents of the s-polarized component.

The beam transmitted through the polarization converting prism array 304 is passed through a first field lens 305 and is reflected by a first cold mirror 306 to bend an optical path of the beam. The beam is then injected into a first dichroic mirror 307 that forms a color separating optical system. The first dichroic mirror 307 reflects one of the three primary colors and transmits the other colors. According to the third embodiment, the first dichroic mirror 307 transmits, for example, R- and G-beams and reflects a B-beam.

The R- and G-beams transmitted through the first dichroic mirror 307 are reflected by a second cold mirror 309 and are injected into a second dichroic mirror 308. The second dichroic mirror 308 transmits the R-beam and reflects the G-beam.

The R-beam transmitted through the second dichroic mirror 308 is passed through a second field lens 316 and a polarizing plate 390, is transmitted through a first reflective polarizing plate (wire grid) 320, and is injected into a reflective spatial light modulator 330 for an R-beam. The first reflective polarizing plate 320 is inclined by 45 degrees relative to the optical path of the R-beam and the reflective spatial light modulator 330 is orthogonal to the optical path.

The G-beam reflected by the second dichroic mirror 308 is passed through a third field lens 317 and a polarizing plate 391, is transmitted through a second reflective polarizing plate (wire grid) 321, and is injected into a reflective spatial light modulator 331 for a G-beam. The second reflective polarizing plate 321 is inclined by 45 degrees relative to the optical path of the G-beam and the reflective spatial light modulator 331 is orthogonal to the optical path.

The B-beam reflected by the first dichroic mirror 307 is reflected by a third cold mirror 310, is further reflected by a fourth cold mirror 312, is transmitted through a third reflective polarizing plate (wire grid) 322, and is injected into a reflective spatial light modulator 332 for a B-beam. The third reflective polarizing plate 322 is inclined by 45 degrees relative to the optical path of the B-beam and the reflective spatial light modulator 332 is orthogonal to the optical path.

In the color separating optical system with the above-mentioned configuration, the optical path lengths of the primary color beams (R-, G-, and B-beams) from the light source 301 to the reflective spatial light modulators 330, 331, and 332 are substantially equal to one another.

The second to fourth cold mirrors 309, 310, and 312 may not be cold mirrors. They may be standard metal-film reflective mirrors or dichroic mirrors to reflect respective color light bands.

The reflective polarizing plates 320, 321, and 322 polarize and separate beams to be injected into the reflective spatial light modulators 330, 331, and 332, so that only linearly polarized components of a first polarized state (p-polarized state in this embodiment) may be transmitted and injected into the corresponding reflective spatial light modulators 330, 331, and 332.

Each of the reflective spatial light modulators 330, 331, and 332 may be a liquid crystal display (LCD) element composed of a silicon substrate, a pixel electrode of metal such as aluminum formed on the silicon substrate, and liquid crystals sealed between the silicon substrate and a transparent substrate. Such LCD elements realize high pixel integration, and therefore, are appropriate for displaying high-resolution images. The LCD element allows a circuit structure to be laid on the inner side of the pixel electrode to improve an open area ratio to about 90% to display bright, smooth, fine images.

The reflective spatial light modulators 330, 331, and 332 modulate the incident beams according to image signals and reflect the modulated beams toward the reflective polarizing plates 320, 321, and 322, respectively. The reflective polarizing plates 320, 321, and 322 polarize and separate the modulated-and-reflected beams from the reflective spatial light modulators 330, 331, and 332 and reflect only linearly polarized components of a second polarized state (s-polarized state in this embodiment).

The beams modulated and reflected by the reflective spatial light modulators 330, 331, and 332 and reflected by the reflective polarizing plates 320, 321, and 322 are injected in three directions into a three-color-combining cross dichroic prism 340 serving as a color combining optical system.

The three-color-combining prism 340 is a so-called Philips prism. The Philips prism is disclosed in, for example, Japanese Patent No. 2505758 and is a prism having no joints at a part corresponding to a screen. The Philips prism is used as a color separation prism for a so-called three-panel video camera. The three-color-combining prism 340 consists of at least three prisms arranged to have at least two pairs of opposing faces. In FIG. 20, the prism 340 is composed of three prisms arranged to form two pairs of opposing faces. Among the pairs of opposing faces, the first pair forms a first reflective layer to transmit the first primary color beam (G-beam) and reflect the second primary color beam (R-beam), and the second pair forms a second reflective layer to transmit the first and second primary color beams (G- and R-beams) and reflect the third primary color beam (B-beam).

In the three-color-combining prism 340, the G-beam is injected into the first prism, is transmitted through the first reflective layer, second prism, second reflective layer, and third prism, and is emitted outside. The R-beam is injected into the second prism, is reflected by the first reflection layer, is transmitted through the second prism, second reflective layer, and third prism, is combined with the G-beam, and is emitted outside. The B-beam is injected into the third prism, is reflected by the second reflective layer, is transmitted through the third prism, is combined with the G- and R-beams, and is emitted outside.

An air interface of a polished face of each prism of the three-color-combining prism 340 is provided with an antireflection film. Between the second prism and the third prism, an air gap may be formed.

In this way, the three-color-combining prism 340 combines the incident primary color beams into a composite beam and emits the composite beam from a front face of the prism 340. The composite beam is injected into a projection lens 350 serving as an image forming unit, which projects the beam onto a screen (not shown) to display a real image.

The image displaying apparatus according to the third embodiment arranges on the same plane the color separating optical system, polarizing and separating units, spatial light modulators, color combining optical system, and image forming unit. Accordingly, the image displaying apparatus as a whole is constituted on the same plane (in a single layer) to reduce the height of the image displaying apparatus and make it compact. The lengths of optical paths between the light source to the spatial light modulators are substantially equal to one another to eliminate relay lenses in the color separating optical system. This simplifies the structure of the optical system, makes the manufacturing of the image displaying apparatus easier, and reduce cost.

In the image displaying apparatus, the color separating optical system has a larger effective diameter than the color combining optical system. Therefore, even if beams from the light source 301 converge toward the reflective spatial light modulators 330, 331, and 332, the beams from the light source can effectively be used.

The image forming unit is not limited to the projection lens 350. It may be a virtual image optical system to provide virtual images.

The image displaying apparatus mentioned above employs the reflective polarizing plate as a polarizing-separating unit unlike the image displaying apparatus of the conventional art that employs the cubic polarizing beam splitter prism as a polarizing-separating unit. The image displaying apparatus of the embodiment passes an illumination beam through the reflective polarizing plate to provide a p-polarized beam. The p-polarized beam is modulated and reflected by the reflective spatial light modulator, and the modulated-and-reflected beam is again injected into the reflective polarizing plate, which reflects an s-polarized beam that is used as an image displaying beam. The reflective polarizing plate has a wire grid face to reflect a beam. The wire grid face must sufficiently be flattened to display high-resolution images without astigmatism.

If the reflective polarizing plate is used to transmit, instead of reflect, a beam containing image information, the obliquely arranged reflective polarizing plate will cause astigmatism to deteriorate resolution.

The reflective polarizing plate is disclosed in, for example, U.S. Pat. No. 6,234,634. This reflective polarizing plate is made of a glass plate whose one side is provided with a metal (aluminum) thin film grid having pitches of a fraction of a wavelength. The metal film has excellent heat resistance, and therefore, it is not necessary to sandwich the reflective polarizing plate between glass prisms. Namely, the reflective polarizing plate can be arranged as a thin glass plate element in an optical path. Compared with a prism, the reflective polarizing plate is lightweight and manufacturable at low cost.

FIG. 21 is a side view showing the polarizing-separating section including the reflective polarizing plate.

In FIG. 21, the reflective polarizing plate 320 (321, 322) of the image displaying apparatus has a top face provided with a reflection reducing coat for a 45-degree incident beam. On the reflective spatial light modulator 330 (331, 332) side, the reflective polarizing plate 320 has the wire grid. The reflective polarizing plate 320 transmits a p-polarized beam and reflects an unnecessary s-polarized beam, which is absorbed by an absorber (not shown) so as not to produce stray light.

The reflective polarizing plate 320 reflects nearly 100% of an s-polarized beam, and therefore, a highly pure p-polarized beam is injected into the reflective spatial light modulator 330.

As mentioned above, the reflective spatial light modulator 330 (331, 332) is made of a silicon substrate, a pixel electrode of metal such as aluminum formed on the silicon substrate, and liquid crystals sealed between the silicon substrate and a transparent substrate. When electrically selected, the modulator 330 converts (modulates) the polarization phase of a reflected outgoing beam so that it differs from the polarization phase of an incoming beam.

In front of an incident face of the reflective spatial light modulator 330 (331, 332), a wave plate 323 is arranged. The wave plate 323 corrects, in going and returning paths, pre-tilts of the liquid crystals that form a polarizing-modulating layer. Namely, a beam is passed through the wave plate 323, is polarized and modulated in response to an electric signal applied to the pixel electrode of the modulator 330, is reflected by the pixel electrode, is again passed through the wave plate 323, and is injected into the bottom face of the reflective polarizing plate 320 (321, 322). The modulated s-polarized beam is reflected by the metal film of the reflective polarizing plate 320 in a 90-degree direction toward an incident face of the three-color-combining cross dichroic prism 340.

The wave plates 323, 324, and 325 arranged in front of the reflective spatial light modulators 330, 331, and 332, respectively, may be quarter-wave plates or half-wave plates.

A correction to be made for a liquid-crystal pre-tilt angle is very small, and therefore, the wave plates may be of $\frac{1}{10}$ wavelength or smaller, more preferably, $\frac{1}{20}$ wavelength or smaller. In an actual arrangement, the wave plates are adjusted in optical axis directions so that a black image projected on the screen may present a most darkened black color when the reflective spatial light modulators are set to a black displaying state.

In front of the incident face of the three-color-combining prism 340, there is a polarizing plate 333 serving as a postpolarizer. The polarizing plate 333 corrects the polarized state of the incident beam to the prism 340, to improve the contrast ratio of an image to be displayed. This is because the reflected beam from the reflective polarizing plate 320 (321, 322) slightly contains a p-polarized component in addition to the s-polarized component.

The polarizing plate 333 may be made of a polarizing film attached to a substrate. The surface of the polarizing plate 333 is provided with an antireflection coat. The polarizing film may directly be attached to the incident face of the three-color-combining prism 340, to reduce the numbers of parts and unnecessary reflective interfaces.

Although FIG. 21 shows only the polarizing-separating section for a red (R) beam, those for green (G) and blue (B) beams have the same configuration as this.

FIG. 22 is a side view showing a beam emanating from the polarizing-separating section, passing through the three-color-combining cross dichroic prism 340, and entering the projection lens 350 in the image displaying apparatus of the third embodiment.

Although FIG. 22 shows only the polarizing-separating section for a red (R) beam, those for green (G) and blue (B) beams have the same configuration as this.

The beam injected into the third field lens 317 is passed through the polarizing plate 391, is transmitted through the reflective polarizing plate 321, is passed through the wave plate 324, and is injected into the reflective spatial light modulator 331. The modulator 331 polarizes, modulates, and reflects the beam. The reflected beam returns to the reflective polarizing plate 321, which reflects an s-polarized component of the beam. The reflected s-polarized component is injected into the three-color-combining prism 340.

Due to a reason concerning wavelength characteristics, it is preferable for the three-color-combining prism 340 to transmit a p-polarized G-beam therethrough. This is advantageous in terms of color purity and light usage efficiency. Accordingly, for the G-beam, there is arranged a half-wave plate 336 in front of a polarizing plate 334 that is placed in front of the prism 340. The half-wave plate 336 rotates a polarized plane by 90 degrees, and therefore, the G-beam polarizing plate 334 is arranged to transmit a p-polarized beam.

The G-beam polarizing plate 334 may be arranged to transmit an s-polarized beam. In this case, the half-wave plate 336 is arranged behind the polarizing plate 334 so that a p-polarized beam is injected into the three-color-combining prism 340.

It is not always necessary to rotate only the G-beam by 90 degrees in the half-wave plate 336 into a p-polarized beam. Namely, the half-wave plate 336 may be omitted, and the G-beam may be left as an s-polarized beam.

In the image displaying apparatus of this embodiment, the illuminating optical system from the light source 301 to the color separating optical system must provide uniform color and intensity for images to display. To achieve this, an incident beam to a multilayer film of, for example, the three-color-combining prism 340 must have no difference in incident angles irrespective of incident points, and a beam that is in-plane uniform must be injected into the liquid crystals of the reflective spatial light modulator 331. For this, the illumination optical system and image forming optical system employ each a telecentric optical system in which a main beam travels in parallel with an optical axis.

The three-color-combining prism 340 combines the color beams into a composite beam, which is injected into the projection lens 350.

In FIG. 22, the three-color-combining prism 340 receives a beam transmitted through the polarizing plate 334, and therefore, the contrast ratio and illuminance of a displayed image will be unaffected by a slight polarization rotation due to double refraction in the glass of the prism 340. Accordingly, the prism 340 can be made of a widely used inexpensive glass material such as BK7. Such a glass material is easy to obtain, inexpensive, and lightweight.

As shown in FIG. 22, a quarter-wave plate 342 may be arranged between the three-color-combining prism 340 and the projection lens 350. The quarter-wave plate 342 prevents unwanted ghost light that is caused by little reflection from the surfaces of lens elements of the projection lens 350 returning to the reflective spatial light modulator 331 and being again reflected toward the screen.

More precisely, as indicated with dotted lines in FIG. 22, a polarized G-beam transmitted through the reflective polarizing plate 321 is modulated by the reflective spatial light modulator 331 into an s-polarized G-beam. The reflective polarizing plate 321 reflects the s-polarized component, and the polarizing plate 334 removes unwanted p-polarized component. Then, the half-wave plate 336 converts the s-polarized beam into a p-polarized beam which is transmitted through the three-color-combining prism 340. The beam is passed through the quarter-wave plate 342 and becomes a circularly polarized beam which is injected into the projection lens 350. Although the surface of each of the lens elements of the projection lens 350 is provided with an antireflection film, there is little reflection that forms a circularly polarized beam turning in an opposite direction from the incident beam and returns to the quarter-wave plate 342. The quarter-wave plate 342 changes the opposite circularly polarized beam into a linearly polarized beam which is an s-polarized beam orthogonal to the incident beam. The s-polarized beam becomes a p-polarized beam after passing through the half-wave plate 336 and is absorbed by the polarizing plate 334.

This action also occurs on the R- and B-beams. In this way, unwanted reflected components to form ghost are removed, and a clear image without ghost is displayed on the screen.

The reflective polarizing plates 320, 321, and 322 are unable to entirely reflect s-polarized components. They partly absorb s-polarized beams to generate heat. Accordingly, if strong beams are injected into the reflective polarizing plates 320, 321, and 322, the temperatures thereof increase by about several tens of degrees to one hundred degrees relative to an ambient temperature. Then, it is necessary to cool the reflective polarizing plates 320, 321, and 322.

The reflective polarizing plates 320, 321, and 322 release heat to bases to which the plates 320, 321, and 322 are attached. In addition, each side of the plates 320, 321, and 322 faces a space which can be used to pass cooling air to cool the plates.

The reflective spatial light modulators 330, 331, and 332 also generate heat to be cooled. According to the embodiment, the back face of each reflective spatial light modulator never interferes with other optical parts, and therefore, there is a sufficient space to attach a heat sink to the back face of the modulator to cool the modulator.

The glass substrates of the reflective polarizing plates 320, 321, and 322 are selected not to cause uneven illuminance due to double refraction. The glass substrates may be made of a material having good heat radiation (for example, quartz having a thermal conductivity of $k \geqq 1$ W/m·K), a material having a relatively low optical elasticity constant of, for example, $\beta \leqq 2$ nm/cm/$10^5$Pa, or a material having a low thermal expansion coefficient (for example, Neoceram® or quartz, those which have expansion coefficients existing in the range between $-10 \times 10^{-7}$/K and $10 \times 10^{-7}$/K under the temperature between 30° C. and 80° C.).

Specifically, glasses having low thermal expansion coefficients as material of glass substrates for the reflective polarizing plates 320, 321, and 322 allow to prevent shading (unevenness) on a projection screen caused by double refraction due to the accumulation of thermal stress, the deterioration of resolution or the declination of registration on a projection screen with respect to three primary colors caused by the thermal deformation or distortion of wire grid.

FIG. 23 is a side view showing a reflective spatial light modulator covered with a glass cover.

In the image displaying apparatus of the third embodiment, foreign matter such as dust on the reflective spatial light modulators may produce shadows on a displayed image to degrade the image. However, any foreign matter setting out of an image forming area on the reflective spatial light modulator 330 (331, 332) will not deteriorate a displayed image. Accordingly, the reflective spatial light modulator 330 is covered with a cover glass 345 to close only the surface of the modulator 330 as shown in FIG. 23. The substrate of the wave plate 323 may serve as a cover glass. The thickness of the cover glass 345 may be about 4 mm so that the focus of foreign matter on the surface of the cover glass 345 may blur and become unclear on the screen. In this case, a space between the reflective polarizing plate 320 and the cover glass 345 may pass cooling air to sufficiently cool the polarizing plate 323 serving as a post polarizer.

Further, sealing the triangular structure comprising the reflective polarizing plate 320, the polarizing plate 333 and the reflective spatial light modulators 330, passing cooling air along the side of the polarizing plate 333 facing to the prism 340, hence overheating of or burning on the polarizing plate 333 may be prevented.

FIG. 24 is a perspective view showing an enclosed structure of the reflective spatial light modulator.

In the image displaying apparatus of the third embodiment, a section starting from the reflective polarizing plates 320, 321, and 322 to the three-color-combining prism 340 may be arranged in an enclosed structure. In this case, the prism 340 and reflective spatial light modulators 330, 331, and 332 are arranged on a substrate 345 and are covered with the reflective polarizing plates 310, 321, and 322 with each gap being closed to form a sealed structure.

The polarizing and separating characteristics of each reflective polarizing plate according to the third embodiment are the same as those of the first embodiment shown in FIGS.

13A and 13B. The materials and characteristics of the optical parts according to the third embodiment may be the same as those of the first embodiment.

As explained above, the image displaying apparatus according to the third embodiment employs the reflective polarizing plates to polarize and separate beams that are injected into the reflective spatial light modulators. Even if the f-value of the optical system is lowered to display bright images with the image displaying apparatus employing the color separating-combining optical system, the contrast ratios of displayed images will never decrease. The reflective polarizing plates realize an optical system that is compact, lightweight, and easy to manufacture.

In the color separating-combining optical system, the optical axes of primary color beams routed through the color separating optical system, reflective polarizing plates, and color combining optical system are substantially on the same plane, and therefore, the optical system as a whole can be minimized to improve space efficiency. In addition, the optical path lengths of primary color beams from the light source to the reflective spatial light modulators are substantially equal to one another. Accordingly, there are no differences in the illumination efficiencies of primary color beams or in incident angles to the reflective spatial light modulators. As a result, the image displaying apparatus employing the color separating-combining optical system can display images of good color balance.

The color separating-combining optical system can employ a Philips prism as the color combining optical system, to minimize the size of the color combining optical system. Unlike an image displaying apparatus whose color combining optical system employs a cross dichroic prism, the image displaying apparatus employing the color separating-combining optical system with the Philips prism causes no abnormality at the center of a displayed image due to joints in the prism.

Order of color separation is not limited to R, G, and B as in the embodiment. R, G, and B may be separated from one another in optional order.

As mentioned above, the color separating-combining optical system according to the third embodiment is capable of maintaining the contrast ratios of displayed images even if the f-value thereof is lowered to provide bright images, efficiently utilizing a beam from a light source, minimizing the size and weight thereof, and realizing easy manufacturing. The color separating-combining optical system according to the third embodiment is advantageous in providing an image displaying apparatus.

That which is claimed:

1. An image displaying apparatus comprising:
    a light source for emitting a beam containing at least three primary colors;
    first to third reflective spatial light modulators corresponding to the three primary colors, respectively;
    a color separating optical system for separating the beam emitted from the light source into three primary color beams and guiding the three primary color beams toward the first to third reflective spatial light modulators;
    first to third wire grid reflective polarizing plates for polarizing and separating the corresponding primary color beam guided by the color separating optical system into a linearly polarized beam of a first polarized state, transmitting and injecting the linearly polarized beam of the first polarized state into the corresponding reflective spatial light modulator, polarizing and separating modulated-and-reflected beam from the corresponding reflective spatial light modulator into a linearly polarized beam of a second polarized state, and reflecting the linearly polarized beam of the second polarized state;
    first to third eliminator polarizing plates for eliminating unwanted light from the corresponding color beams modulated by the reflective spatial light modulators and reflected by the wire grid reflective polarizing plates;
    a color combining optical system for combining the primary color beams received from the polarizing plates into a composite beam;
    an image forming optical unit for receiving the composite beam and forming an image according to the received composite beam; and
    wherein the color separating optical system comprises:
        a first dichroic mirror for separating the beam from the light source into a first-second primary color beam and a third primary color beam;
        a second dichroic mirror for separating the first-second primary color beam into a first primary color beam and a second primary color beam; and
        first to third steering mirrors for substantially vertically deflecting the first to third primary color beams, respectively, toward the first to third reflective polarizing plates and first to third reflective spatial light modulators; and
    wherein the optical axes of the beams traveling from the first to third steering mirrors to the first to third reflective spatial light modulators are parallel to one another; and
    wherein the color separating optical system is disposed in another layer in relation to the layer of the color combining optical system, and the dichroic mirrors in the color separating optical system are disposed outside of respective spatial light modulators and steering mirrors in view from a normal direction of a plane containing the spatial light modulators.

2. The image displaying apparatus of claim 1, wherein the color combining optical system is a cross dichroic prism, the first to third reflective spatial light modulators are attached to a planar substrate at three locations around the cross dichroic prism that is also attached to the planar substrate, and beam incident faces of the reflective spatial light modulators are substantially on the same plane.

* * * * *